US012649800B2

(12) United States Patent
Cui et al.

(10) Patent No.: US 12,649,800 B2
(45) Date of Patent: Jun. 9, 2026

(54) CATALYST FOR PROPYLENE POLYMERIZATION, CATALYST SYSTEM FOR PROPYLENE POLYMERIZATION, AND PREPARATION AND USE THEREOF

(71) Applicant: PETROCHINA COMPANY LIMITED, Beijing (CN)

(72) Inventors: Liang Cui, Beijing (CN); Jianjun Yi, Beijing (CN); Junyu Lei, Beijing (CN); Haijun Hao, Beijing (CN); Kefeng Wang, Beijing (CN); Shisheng Zhao, Beijing (CN); Junpeng Zhuang, Beijing (CN); Shenghui Zhang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 649 days.

(21) Appl. No.: 17/924,058

(22) PCT Filed: May 6, 2021

(86) PCT No.: PCT/CN2021/091877
§ 371 (c)(1),
(2) Date: Nov. 8, 2022

(87) PCT Pub. No.: WO2021/227920
PCT Pub. Date: Nov. 18, 2021

(65) Prior Publication Data

US 2023/0183394 A1 Jun. 15, 2023

(30) Foreign Application Priority Data

May 9, 2020 (CN) ........................ 202010385500.7

(51) Int. Cl.

| | |
|---|---|
| ***C08F 4/649*** | (2006.01) |
| ***C08F 4/02*** | (2006.01) |
| ***C08F 110/06*** | (2006.01) |

(52) U.S. Cl.
CPC ............ *C08F 4/6496* (2013.01); *C08F 4/022* (2013.01); *C08F 110/06* (2013.01)

(58) Field of Classification Search
CPC ....... C08F 4/6496; C08F 4/022; C08F 110/06
See application file for complete search history.

(56) References Cited

U.S. PATENT DOCUMENTS

| | | | |
|---|---|---|---|
| 6,365,685 B1 | 4/2002 | Collina et al. | |
| 6,395,670 B1 | 5/2002 | Morini et al. | |
| 6,433,119 B1 | 8/2002 | Smith | |
| 6,818,583 B1 | 11/2004 | Morini et al. | |
| 2001/0020073 A1 | 9/2001 | Spaether et al. | |
| 2002/0183575 A1 | 12/2002 | Morini et al. | |
| 2003/0199388 A1 | 10/2003 | Morini et al. | |
| 2003/0207754 A1 | 11/2003 | Morini et al. | |
| 2005/0032633 A1 | 2/2005 | Morini et al. | |
| 2005/0070622 A1 | 3/2005 | Kalgutkar et al. | |
| 2005/0154157 A1 | 7/2005 | Morini et al. | |
| 2010/0184930 A1* | 7/2010 | Yi | C08F 110/06 502/122 |
| 2011/0144067 A1 | 6/2011 | Toscano et al. | |

FOREIGN PATENT DOCUMENTS

| | | |
|---|---|---|
| CN | 1453298 A | 11/2003 |
| CN | 1690039 A | 11/2005 |
| CN | 101125898 A | 2/2008 |
| CN | 101323650 A | 12/2008 |
| CN | 101579642 A | 11/2009 |
| CN | 101628950 A | 1/2010 |
| CN | 101735346 A | 6/2010 |

(Continued)

OTHER PUBLICATIONS

Office Action issued on Dec. 26, 2023, in Japanese Patent Application No. 2022-568455.

(Continued)

*Primary Examiner* — Yong L Chu

(74) *Attorney, Agent, or Firm* — Meunier Carlin & Curfman LLC

(57) ABSTRACT

The present invention relates to a catalyst for propylene polymerization, a catalyst system for propylene polymerization and preparation and use thereof. The catalyst for propylene polymerization comprises: an activated magnesium halide, a titanium compound supported on the activated magnesium halide containing at least one Ti-halogen bond, and an internal electron donor compound selected from one or more of compounds having a structure of below Formula (1), wherein $R_1$ and $R_6$ are each independently selected from a $C_1$-$C_{12}$ straight or branched alkyl, a $C_3$-$C_{15}$ cycloalkyl or aryl, and R' is H, a $C_1$-$C_5$ straight or branched alkyl, or phenyl; $R_2$, $R_3$, $R_4$, and $R_5$ are each independently selected from H, halogen, a $C_1$-$C_{12}$ straight or branched alkyl, a $C_3$-$C_8$ cycloalkyl, a $C_6$-$C_{15}$ aryl, or arylalkyl. The present invention can provide a catalyst showing high polymerization reaction activity and excellent stereospecificity, by applying a novel type of internal electron donor.

20 Claims, 12 Drawing Sheets

(56) References Cited

FOREIGN PATENT DOCUMENTS

| | | | |
|---|---|---|---|
| CN | 101747455 | A | 6/2010 |
| CN | 101787088 | A | 7/2010 |
| CN | 102942642 | A | 2/2013 |
| CN | 103509218 | A | 1/2014 |
| CN | 104628910 | A | 5/2015 |
| CN | 104628911 | A | 5/2015 |
| CN | 104829756 | A | 8/2015 |
| CN | 105985469 | A | 10/2016 |
| CN | 106496373 | A | 3/2017 |
| CN | 106608933 | A | 5/2017 |
| CN | 106905452 | A | 6/2017 |
| CN | 108727524 | A | 11/2018 |
| CN | 111100042 | A | 5/2020 |
| EP | 728769 | A1 | 8/1996 |
| WO | 03002617 | A1 | 1/2003 |
| WO | 03022894 | A1 | 3/2003 |
| WO | 03076480 | A1 | 9/2003 |
| WO | 2004005359 | A1 | 1/2004 |
| WO | 2004106388 | A2 | 12/2004 |
| WO | 2005047351 | A1 | 5/2005 |
| WO | 2005097841 | A1 | 10/2005 |
| WO | 2017117443 | A1 | 7/2017 |

OTHER PUBLICATIONS

English Translation of the International Search Report in Application No. PCT/CN2021/091877, mailed Aug. 12, 2021, 2 pages.

He F., et al., "Research Progress on the Mechanism of Internal and External Electron Donors in Polypropylene," World Petroleum Industry, Jun. 30, 2019, vol. 26, Issue. 03, pp. 30-35. English abstract included.

Li T-T., et al., "The Effect of Hydrogen Bond on Bronsted Acid-catalyzed Intramolecular Hydroamination of Unfunctionalized Olefins," Tetrahedron (2015).

First Office Action and search report issued on Mar. 3, 2022 for counterpart Chinese patent application No. 202010385500.7 with machine EN translation downloaded from EPO.

* cited by examiner

CATALYST FOR PROPYLENE POLYMERIZATION, CATALYST SYSTEM FOR PROPYLENE POLYMERIZATION, AND PREPARATION AND USE THEREOF

TECHNICAL FIELD

The present invention relates to the field of catalysts, and in particular, to a catalyst for propylene polymerization, a catalyst system for propylene polymerization, and preparation and use thereof.

BACKGROUND ART

Solid catalysts having Mg, Ti, halogen and electron donors as basic components can be used for polymerization of $CH_2{=}CHR$ olefins, and may produce polymers with high tacticity in a high yield, especially in the polymerization of α-olefins with three or more carbon atoms. In these catalysts, the internal electron donor compound, as an important component of a Ziegler-Natta catalyst, plays a crucial role in the improvement of catalyst performance and is one of the key factors affecting the catalyst performance. It can not only improve the catalyst activity, but also improve the stereospecific ability of the catalyst, allowing the polymerization products to have high tacticity. Therefore, the development of electron-donating compounds has led to continuous renewals of catalysts for polyolefins.

There are many compounds that can be used as the internal electron donor for Ziegler-Natta catalysts, including polycarboxylic acids, mono- or poly-carboxylic acid esters, anhydrides, ketones, mono- or poly-ethers, etc., and their derivatives, among which commonly used are aromatic dicarboxylic acid esters, such as di-n-butyl phthalate or di-isobutyl phthalate (see U.S. Pat. No. 6,365,685B1, US20010020073A1). WO 2005097841 A1 discloses a catalyst component using an electron donor which is a keto ester derivative having a specific chemical formula; WO 2005047351 A1 relates to an internal electron donor that is a thiophene dicarboxylic acid ester having a specific chemical formula; WO 2004106388 A2 relates to an internal electron donor mainly selected from ethers, lipids and alkoxy silanes, in particular C1 to C20 cyclic ethers, alkyl esters and aliphatic carboxylic acids; WO 03002617 A1 relates to a monofunctional electron donor (MD) selected from esters, ethers, amides or ketones; U.S. Pat. No. 6,433,119 B1 relates to use of an internal electron donor in a supported catalyst component, which includes acetate esters, anhydrides, ketones, aldehydes and mono- and di-functional organic acid esters; US 20030207754 A1 and US 20030199388 A1 relate to internal electron donors which are malonates; WO 2004005359 A1, U.S. Pat. No. 6,818,583 B1, US 20020183575 A1 and US 20050032633 A1 relates to internal electron donors which are succinates, and can improve the activity of the catalyst, and significantly widen the molecular distribution of the produced propylene. WO 03076480 A1, WO 03022894 A1, U.S. Pat. No. 6,395,670 B1, US 20050154157 A1, EP 728769 A1 and the like demonstrate that substituents having a larger spatial volume or high symmetry at the carbon atom at position 2 of 1,3-diether electron donor compounds are favorable for improvement of catalytic activity and polymer isotacticity, and render the catalysts with high hydrogen sensitivity. CN 1453298 A, CN 1690039 A, CN 101125898 A, CN 105985469 A, CN 104628911 A and the like reported compounds such as diol esters, cyclic esters, polyether esters, and phosphate esters used as an internal electron donor.

Although catalysts having phthalic acid diesters as the internal electron donor have been applied, residual phthalic acid diesters in the polypropylene products after use of the catalysts can affect male fertility, and thus corresponding regulations have been enacted in many countries to restrict use of plastic products with excessive phthalate esters. Therefore, in the development of catalysts for olefin polymerization, it is required to avoid use of phthalic acid diesters in the preparation process, and it is aimed at improving the overall performance of catalysts. Therefore, there is a need to keep developing internal electron-donating compounds having a novel structure and applying them to catalysts for olefin polymerization.

SUMMARY OF THE INVENTION

An objective of the present invention is to provide a catalyst for propylene polymerization showing high activity in polymerization reaction and good stereospecificity, a catalyst system for propylene polymerization, and preparation and use thereof.

In order to achieve the above objective, the present invention provides the following technical solutions.

A first aspect of the present invention provides a catalyst for propylene polymerization, comprising:

- an activated magnesium halide, a titanium compound supported on the activated magnesium halide containing at least one Ti-halogen bond, and an internal electron donor compound;
- wherein the internal electron donor compound is selected from one or more of the compounds having a structure of Formula (1):

[Formula (1)]

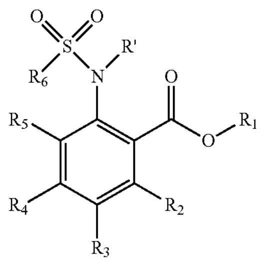

- wherein $R_1$ and $R_6$ are each independently selected from a $C_1$-$C_{12}$ straight or branched alkyl, a $C_3$-$C_{15}$ cycloalkyl, or an aryl, and R' is H, a $C_1$-$C_5$ straight or branched alkyl, or phenyl.
- $R_2$, $R_3$, $R_4$, and $R_5$ are each independently selected from H, halogen, a $C_1$-$C_{12}$ straight or branched alkyl, a $C_3$-$C_8$ cycloalkyl, a $C_6$-$C_{15}$ aryl, or an arylalkyl.

In an embodiment of the present invention, in Formula (1), R' is methyl.

In an embodiment of the present invention, in Formula (1), $R_6$ is selected from a $C_1$-$C_{12}$ straight or branched alkyl, or phenyl.

In an embodiment of the present invention, in Formula (1), $R_1$ is selected from a $C_1$-$C_{12}$ straight or branched alkyl.

In an embodiment of the present invention, in Formula (1), $R_2$, $R_3$, $R_4$ and $R_5$ are all H atoms.

In an embodiment of the present invention, the internal electron donor compound is one or more selected from the following compounds:

Butyl 2-(N-methylbutylsulfonamido)benzoate

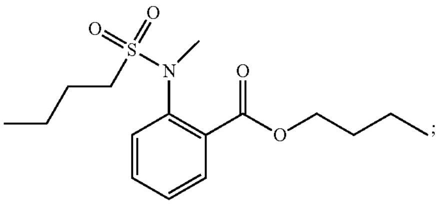 [SMILES: CCCCOC(=O)c1ccccc1N(C)S(=O)(=O)CCCC]

Methyl 2-(N-methylphenylsulfonamido)benzoate

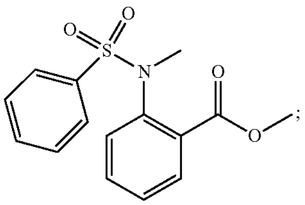 [SMILES: COC(=O)c1ccccc1N(C)S(=O)(=O)c1ccccc1]

Methyl 2-(N-methylbutylsulfonamido)benzoate.

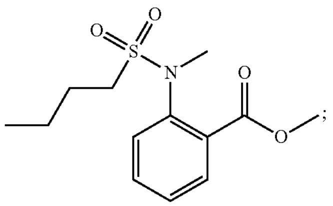 [SMILES: CCCCS(=O)(=O)N(C)c1ccccc1C(=O)OC]

Isopropyl 2-(N-methylphenylsulfonamido)benzoate

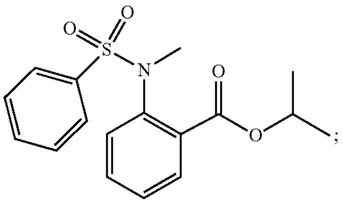 [SMILES: CC(C)OC(=O)c1ccccc1N(C)S(=O)(=O)c1ccccc1]

Propyl 2-(N-methylbutylsulfonamido)benzoate

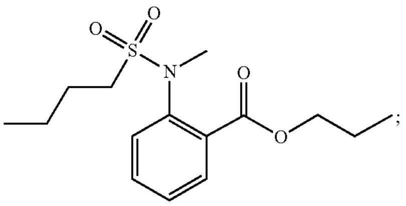 [SMILES: CCCCS(=O)(=O)N(C)c1ccccc1C(=O)OCCC]

Isobutyl 2-(N-methylethylsulfonamido)benzoate

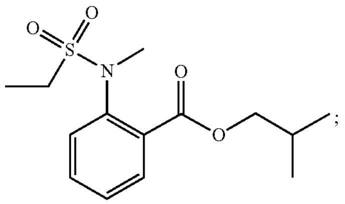 [SMILES: CCS(=O)(=O)N(C)c1ccccc1C(=O)OCC(C)C]

Methyl 2-(N-methylmethylsulfonamido)benzoate

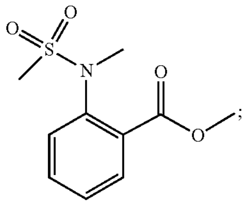 [SMILES: COC(=O)c1ccccc1N(C)S(C)(=O)=O]

Neopentyl 2-(N-methylbutylsulfonamido)benzoate

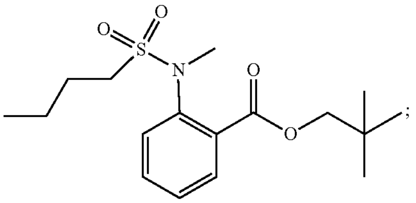 [SMILES: CCCCS(=O)(=O)N(C)c1ccccc1C(=O)OCC(C)(C)C]

Cyclohexyl 2-(N-methylpropylsulfonamido)benzoate

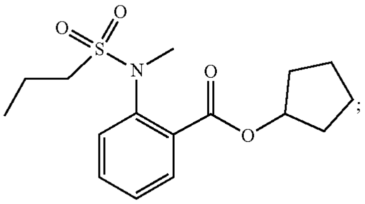 [SMILES: CCCS(=O)(=O)N(C)c1ccccc1C(=O)OC1CCCC1]

Cyclopentyl 2-(N-methylpropylsulfonamido)benzoate

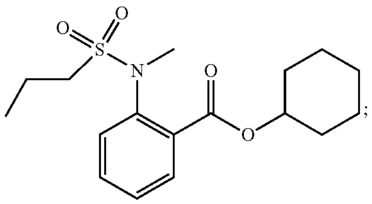 [SMILES: CCCS(=O)(=O)N(C)c1ccccc1C(=O)OC1CCCCC1]

Methyl 2-(N-methylcyclopropylsulfonamido)benzoate

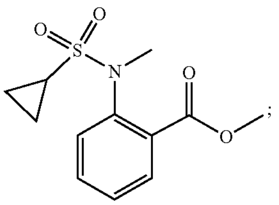 [SMILES: COC(=O)c1ccccc1N(C)S(=O)(=O)C1CC1]

Methyl 2-(N-methylcyclopentylsulfonamido)benzoate

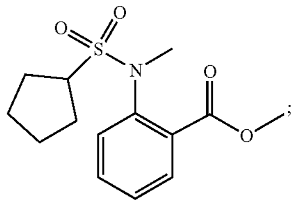 [SMILES: COC(=O)c1ccccc1N(C)S(=O)(=O)C1CCCC1]

Methyl 2-(N-methylpentylsulfonamido)benzoate.

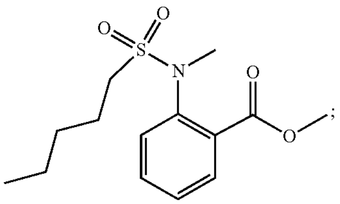 [SMILES: CCCCCS(=O)(=O)N(C)c1ccccc1C(=O)OC]

Isopropyl 2-(N-methylcyclohexylsulfonamido)benzoate

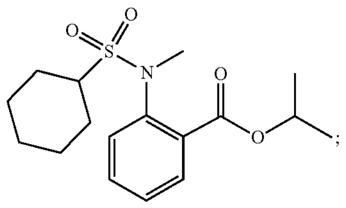 [SMILES: CC(C)OC(=O)c1ccccc1N(C)S(=O)(=O)C1CCCCC1]

Propyl 2-(N-methylheptylsulfonamido)benzoate.

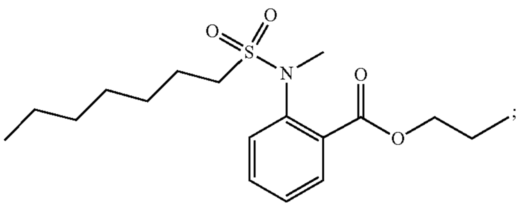 [SMILES: CCCCCCCS(=O)(=O)N(C)c1ccccc1C(=O)OCCC]

Isobutyl 2-(N-methyl p-tolylsulfonamido)benzoate

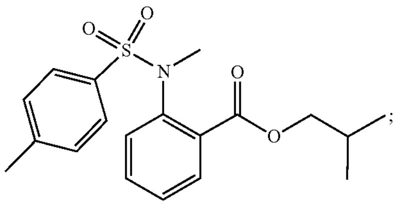 [SMILES: Cc1ccc(S(=O)(=O)N(C)c2ccccc2C(=O)OCC(C)C)cc1]

Phenyl 2-(N-methylbutylsulfonamido)benzoate

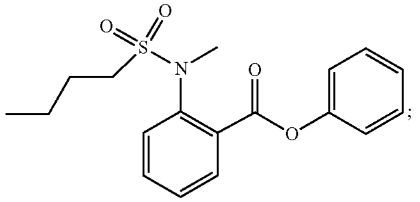 [SMILES: CCCCS(=O)(=O)N(C)c1ccccc1C(=O)Oc1ccccc1]

Isooctyl 2-(N-methylbutylsulfonamido)benzoate;
p-tolyl 2-(N-methylpropylsulfonamido)benzoate;
Ethyl 2-(N-methylethylsulfonamido)benzoate;
Ethyl 2-(N-methylpentylsulfonamido)benzoate;
Isobutyl 2-(N-methylphenylsulfonamido)benzoate;
Isobutyl 2-(N-methylbutylsulfonamido)benzoate;
Neopentyl 2-(N-methyl-p-tolylsulfonamido)benzoate;
p-tolyl 2-(N-methylbutylsulfonamido)benzoate;
Isooctyl 2-(N-methylethylsulfonamido)benzoate;
p-tolyl 2-(N-methylcyclohexylsulfonamido)benzoate;
Propyl 2-(N-methyl-β-naphthylsulfonamido)benzoate;

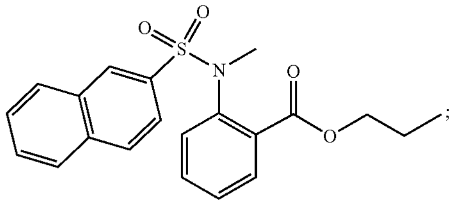 [SMILES: CCCOC(=O)c1ccccc1N(C)S(=O)(=O)c1ccc2ccccc2c1]

Methyl 2,3,4,5-tetramethyl-6-(N-methylsulfonamido)benzoate

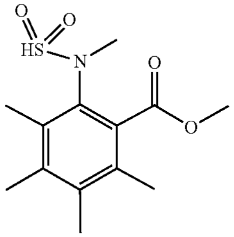

Methyl 4-bromo-6-(N-ethylsulfonamido)benzoate;
Methyl 3-isopropyl-6-(N-butylsulfonamido)benzoate;
Butyl 2-(N-butylsulfonamido)benzoate;
Methyl 2-(N-phenylsulfonamido)benzoate;
Methyl 2-(N-butylsulfonamido)benzoate;
Isopropyl 2-(N-phenylsulfonamido)benzoate;

Propyl 2-(N-butylsulfonamido)benzoate; and

Isobutyl 2-(N-ethylsulfonamido)benzoate.

In an embodiment of the present invention, the internal electron donor compound is one selected from the following compounds:

Butyl 2-(N-methylbutylsulfonamido)benzoate

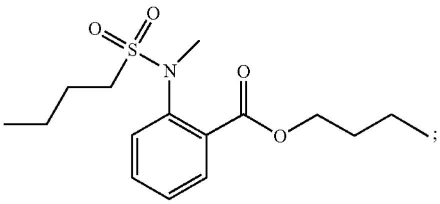 [SMILES: CCCCOC(=O)c1ccccc1N(C)S(=O)(=O)CCCC]

;

Methyl 2-(N-methylphenylsulfonamido)benzoate

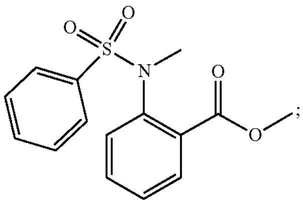 [SMILES: COC(=O)c1ccccc1N(C)S(=O)(=O)c1ccccc1]

;

Methyl 2-(N-methylbutylsulfonamido)benzoate.

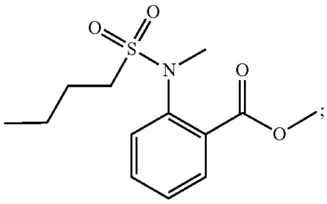 [SMILES: CCCCS(=O)(=O)N(C)c1ccccc1C(=O)OC]

;

Isopropyl 2-(N-methylphenylsulfonamido)benzoate

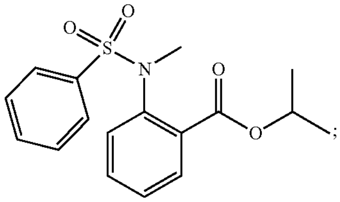 [SMILES: CC(C)OC(=O)c1ccccc1N(C)S(=O)(=O)c1ccccc1]

;

Propyl 2-(N-methylbutylsulfonamido)benzoate

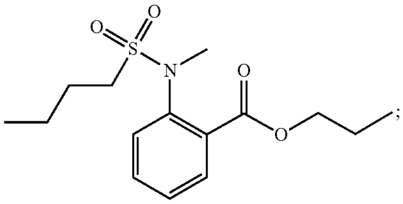 [SMILES: CCCCS(=O)(=O)N(C)c1ccccc1C(=O)OCCC]

;

and

Isobutyl 2-(N-methylethylsulfonamido)benzoate

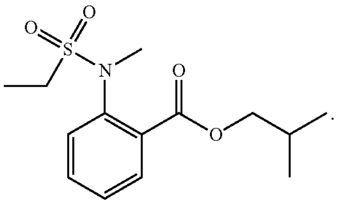 [SMILES: CCS(=O)(=O)N(C)c1ccccc1C(=O)OCC(C)C]

.

In an embodiment of the present invention, the precursor of the activated magnesium halide is a magnesium halide alcoholate;

the magnesium halide alcoholate has a general formula of $Mg(OR')_{2-m}X_m \cdot n(R^2OH)$, wherein $R^1$ is selected from a $C_1$-$C_{20}$ alkyl, X is halogen, m is 1 or 2, n is a fractional or integer number satisfying $0<n<5$, and $R^2$ is selected from a $C_1$-$C_{20}$ alkyl.

In an embodiment of the present invention, the magnesium halide in the magnesium halide alcoholate comprises one or more of magnesium chloride, magnesium bromide, magnesium chloride methoxide, and magnesium chloride ethoxide; and the alcohol in the magnesium halide alcoholate comprises one or more of methanol, ethanol, propanol, isopropanol, butanol and isobutanol.

In an embodiment of the present invention, in the magnesium halide alcoholate, the magnesium halide is magnesium chloride and the alcohol is ethanol.

In an embodiment of the present invention, the titanium compound comprises one or more of titanium chloride trialkoxide, titanium dichloride dialkoxide, titanium trichloride alkoxide, titanium tetrachloride, and titanium tetrabromide.

In an embodiment of the present invention, the titanium compound is titanium tetrachloride.

In an embodiment of the present invention, based on 100% of the total mass of the catalyst for propylene polymerization, the content of the magnesium element is 10% to 25% by mass, the content of the titanium element is 1% to 15% by mass, the total content of halogen in the magnesium halide and the titanium compound is 40% to 60% by mass, and the content of the internal electron donor is 1% to 10% by mass.

A second aspect of the present invention provides a method for preparing the catalyst for propylene polymerization as described above, comprising the steps of:

(S1) adding the precursor of the activated magnesium halide to a portion of the titanium compound liquid, and cooling them to a first predetermined temperature to allow a reaction to proceed;

(S2) increasing gradually the temperature to a second predetermined temperature, adding the internal electron donor compound, and allowing the reaction to continue;

(S3) adding the remainder of the titanium compound at a third predetermined temperature, allowing the reaction to continue, and filtering the reaction system after the reaction is completed, to obtain a solid residue; and (S4) washing and drying the solid residue to obtain the catalyst for propylene polymerization.

In an embodiment of the present invention, in step (S1), the first predetermined temperature is −40° C. to 0° C., and the reaction proceeds for a period of 0.1 h to 3 h;

in step (S2), the second predetermined temperature is 40° C. to 100° C., and the reaction proceeds for a period of 0.5 h to 3 h;

in step (S3), the third predetermined temperature is 80° C. to 140° C., and the reaction proceeds for a period of 0.5 h to 3 h; and in step (S2) the molar ratio of the magnesium element to the internal electron donor compound is 1:1 to 20:1; preferably 2:1 to 10:1.

In an embodiment of the present invention, the internal electron donor is prepared by the following method:

allowing a 2-aminobenzoate compound of Formula (2) as a raw material to react with a base in a molar ratio of 1:1 to 1:2 for 1 h to 10 h, in an organic solvent at a temperature of −78° C. to 50° C., and then carrying out a further reaction with R'X for 1 h to 150 h without separation, wherein the feeding molar ratio of the 2-aminobenzoate compound of Formula (2) to R'X is 1:1 to 1:50.

[Formula (2)]

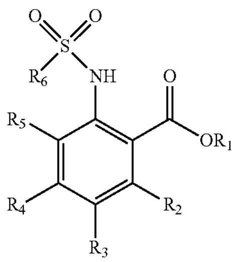

In Formula (2), $R_1$ and $R_6$ are each independently selected from a $C_1$-$C_{12}$ straight or branched alkyl, a $C_3$-$C_{15}$ cycloalkyl, or an aryl, and R' is an H atom, a $C_1$-$C_5$ straight or branched alkyl, or phenyl; $R_2$, $R_3$, $R_4$, and $R_5$ are each independently selected from H, halogen, a $C_1$-$C_{12}$ straight or branched alkyl, a $C_3$-$C_8$ cycloalkyl, a $C_6$-$C_{15}$ aryl or an arylalkyl; in the R'X, R' is methyl; and X═Br, I, or $O_3SC_6H_5$.

In an embodiment of the present invention, regarding the preparation of the internal electron donor compound, the base is one selected from NaH and lithium diisopropylamine.

In an embodiment of the present invention, regarding the preparation of the internal electron donor compound, the organic solvent is one selected from N,N-dimethylformamide and tetrahydrofuran.

In an embodiment of the present invention, the internal electron donor compound is prepared by a method comprising:

allowing a 2-aminobenzoate compound of Formula (2) as a reaction substrate to react with NaH and iodomethane in a feeding molar ratio of 1:1:1 to 1:20:50 at a temperature of −78° C. to 50° C. for a period of 1 h to 150 h, in an anhydrous and oxygen-free reaction system with DMF and THE as solvents; and after the reaction is completed, carrying out neutralization, extraction, washing, rotary evaporation, column chromatography, etc., and then vacuum drying, to obtain a solid or oily liquid as the corresponding methylation product (i.e., the inner electron donor compound according to the invention), in a yield of about 70%.

In an embodiment of the present invention, regarding the preparation of the internal electron donor compound, the feeding molar ratio of the 2-aminobenzoate compound of Formula (2), NaH, and iodomethane is 1:1:1 to 1:5:10.

In an embodiment of the present invention, regarding the preparation of the internal electron donor compound, the reaction is carried out at a temperature of 0° C. to 30° C.

In an embodiment of the present invention, regarding the preparation for the internal electron donor compound, the reaction is carried out for a period of 12 h to 100 h.

The present invention provides a general synthesis process for a 2-aminobenzoate compound of Formula (2), comprising:

dissolving a 2-aminobenzoate compound of Formula (3) in tetrahydrofuran or dimethylformamide (DMF), adding triethylamine in a 1- to 5-fold amount as an acid binding agent, and adding alkylsulfonyl chloride at −30° C. to 50° C. to allow a reaction to proceed at a temperature of preferably 0 to 10° C. for a period of 2 h to 120 h, preferably 30 h to 40 h; adding water to carry out hydrolysis, followed by extraction with ethyl acetate, concentration, and separation and purification by column chromatography, to obtain a final product, in a yield of 30% to 95% for the entire synthesis process.

[Formula (3)]

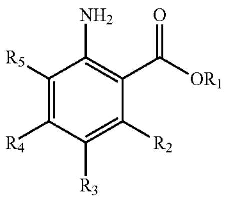

In an embodiment of the present invention, the 2-aminobenzoate compound of Formula (3) is obtained by esterification of 2-aminobenzoic acid with an alcohol by a general synthesis process as follows:

dissolving 2-aminobenzoic acid in an alcohol HORI used as a solvent in great excess, with the ratio of 2-aminobenzoic acid to HORI being 1:5 to 10,000, preferably at room temperature;

adding concentrated $H_2SO_4$ as a catalyst in a 0.01- to 1-fold molar amount, preferably in a 0.2-fold molar amount, and allowing a reaction to proceed at a temperature between room temperature and 150° C., preferably at 100° C., for a period of 5 h to 60 h, preferably 36 h;

after hydrolysis, concentrating the resultant in dichloromethane and purifying it by column chromatography, to obtain the product in a yield of 30% to 95%, wherein, the $R_1$ in $HOR_1$ is defined as in Formula (1).

A third aspect of the present invention provides a catalyst system for propylene polymerization, comprising the catalyst for propylene polymerization as described above, a co-catalyst, and an external electron donor.

In an embodiment of the present invention, the co-catalyst is an alkyl aluminum compound having a general formula of $AlR^3_pX_{3-p}$, wherein $R^3$ is a $C_1$-$C_{20}$ alkyl; X is halogen, and p is an integer satisfying 1≤p≤ 3.

The external electron donor is a siloxane compound having a general formula of $R^4_qSi(OR^5)_{4-q}$, wherein $R^4$ is a $C_1$-$C_{10}$ alkyl, cycloalkyl, or aryl; $R^5$ is an alkyl having 1 to 4 carbon atoms; and q is an integer satisfying 0≤n≤3.

In an embodiment of the present invention, the co-catalyst comprises trimethylaluminum, triethylaluminum, triisobutylaluminum, trioctylaluminum, diethylaluminum monohydride, diisobutylaluminum monohydride, diethylaluminum monochloride, diisobutylaluminum monochloride, or ethylaluminum dichloride.

In an embodiment of the present invention, the external electron donor comprises phenyltrimethoxysilane, phenyltriethoxysilane, or diphenyldimethoxysilane.

In an embodiment of the present invention, the molar ratio of titanium in the catalyst for propylene polymerization to aluminum in the co-catalyst is 1:1 to 1:2,000; preferably 1:5 to 1:500; and the molar ratio Si/Ti of Si in the external electron donor to Ti in the catalyst for propylene polymerization is 1:1 to 1:100, preferably 1:1 to 1:50.

A fourth aspect of the present invention provides use of the catalyst for propylene polymerization catalyst or the catalyst system for propylene polymerization as described above in propylene polymerization.

For the above use, various methods in the existing olefin polymerization technologies can be used, including but not limited to bulk polymerization, slurry polymerization, and vapor-phase polymerization. Taking bulk polymerization of propylene as an example, the basic process for using the catalyst is briefly described as follows: sufficiently purging a polymerization reactor with nitrogen, followed by vacuum drying; introducing propylene monomers, and introducing the catalyst for propylene polymerization according to the present invention, a co-catalyst, and an external electron donor in a certain ratio; performing polymerization at a temperature of 20 to 90° C., preferably 60 to 80° C., for a period of 1 to 2 h; venting the reactor and sufficiently purging it with nitrogen, to obtain a dry polymer.

Advantages of the Present Invention

The catalyst for propylene polymerization according to the present invention uses a novel type of internal electron donor, and can provide a catalyst having high activity in polymerization reaction and excellent stereospecificity.

DETAILED DESCRIPTION OF THE INVENTION

Figure 1:
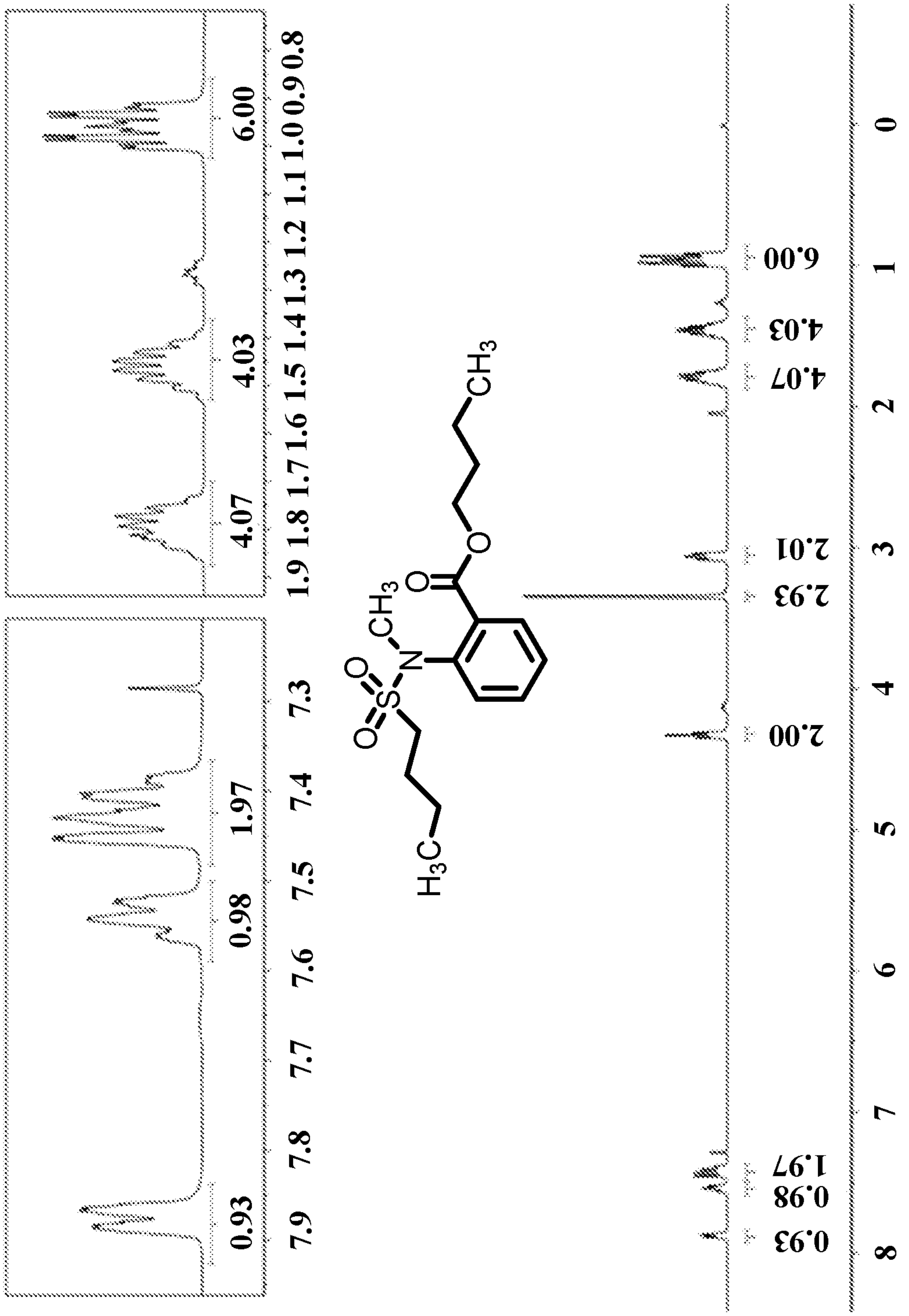
FIG. 1 shows the $^{1}H$ spectrum of butyl 2-(N-methylbutylsulfonamido)benzoate obtained in Example 1.

The present invention is further described below in connection with preferred embodiments to illustrate the present invention more clearly. It should be understood by those skilled in the art that the specific contents described below are illustrative and not limiting, and should not be construed to limit the scope of protection of the present invention.

Test Procedures (1) The structures of the synthesized electron donor compounds were determined by NMR.

(2) The isotacticity of the polymer products was determined by the boiling n-heptane extraction method according to National Standard GB/T 2412-2008.

(3) The catalyst activity was calculated based on the mass ratio of the polymer produced by the reaction to the input catalyst.

Part I. Synthesis of Compounds

Example 1

This Example provides butyl 2-(N-methylbutylsulfonamido)benzoate having a structure of:

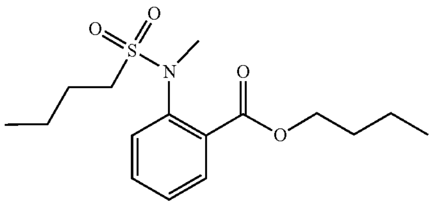 [SMILES: CCCCOC(=O)c1ccccc1N(C)S(=O)(=O)CCCC]

which is prepared by the following method:

Step (1): To a 1000 mL flask, 30.0 g 2-aminobenzoic acid, 800 mL n-butanol, and 50 mL concentrated $H_2SO_4$ (98.3% by mass) were added, and allowed to react continuously for about 36 h under heating in an oil bath at 100° C. and under stirring. Then the reaction solution was transferred to a 2000 mL flask, the n-butanol and water were removed, and the orange-yellow residue liquid was dissolved in 600 mL water and transferred to a 2000 mL beaker, to which an appropriate amount of $NaHCO_3$ was added to neutralize excess $H_2SO_4$ until no bubbles were generated (pH≤7). Then about 300 mL dichloromethane was added thereto for extraction, the organic phase was separated, and the solvent was removed to obtain a crude product.

The resultant is purified by column chromatography to obtain 16.62 g oily butyl 2-aminobenzoate, in a yield of 39%.

Step (2): To a 250 mL flask, 12.00 g butyl 2-aminobenzoate, 50 mL tetrahydrofuran and 11 mL triethylamine were added; and then 12 g butyl sulfonyl chloride dissolved in 70 mL ethyl acetate was added dropwise to the flask, followed by stirring for about 42 h. Afterwards, the reaction solution was transferred to a 1000 mL separatory funnel, and about 300 mL water was added thereto. The resultant was extracted with ethyl acetate, and the solvent was removed to obtain a crude product, which was purified by column chromatography to obtain 14 g butyl 2-butylsulfonamido benzoate, in a yield of 70%.

Step (3): 1.52 g NaH was dissolved in 30 mL DMF, and 13 g butyl 2-butylsulfonamido benzoate dissolved in 60 mL DMF was added to a Schlenk bottle, following by stirring for about 2 h. After $H_2$ was completely released, 18 g iodomethane dissolved in 150 mL THE was added dropwise to the reaction solution, which was stirred for 36 h at room temperature, and then an appropriate amount of concentrated hydrochloric acid was slowly added dropwise to the reaction solution to neutralize excess NaH until the pH was 7 or lower. Afterwards, the reaction solution was transferred to a 1000 mL separatory funnel and 200 ml water was added to carry out hydrolysis, followed by extraction with methyl t-butyl ether. The organic phase from the extraction was concentrated to obtain a crude product, which was purified by column chromatography to obtain 10 g butyl 2-(N-methylbutylsulfonamido)benzoate as a yellow oil, in a yield of 71%.

Figure 2:
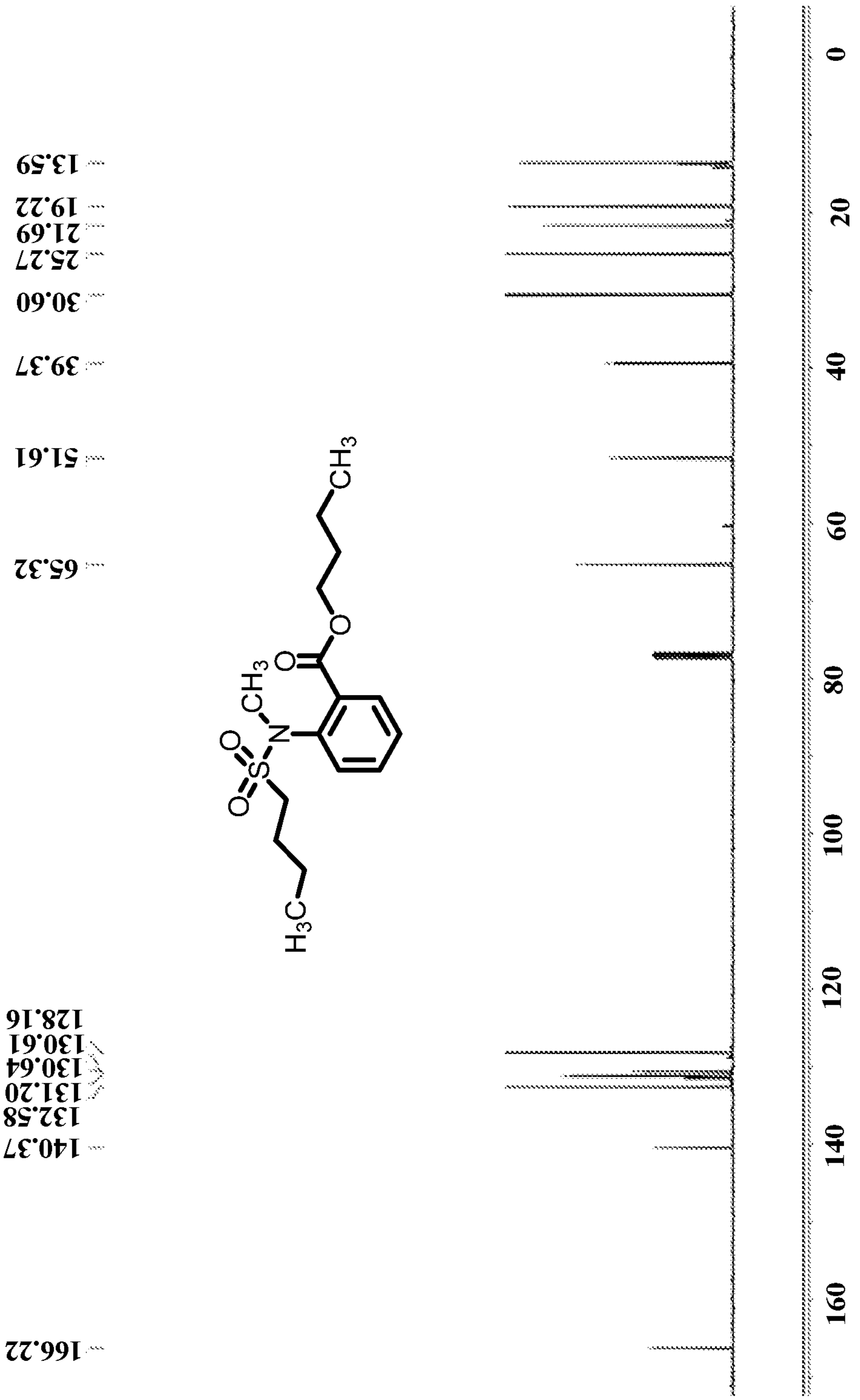
FIG. 2 shows the $^{13}C$ spectrum of butyl 2-(N-methylbutylsulfonamido)benzoate obtained in Example 1.

The $^{1}H$ and $^{13}C$ NMR spectra of the butyl 2-(N-methylbutylsulfonamido)benzoate are shown in FIGS. 1 and 2.

$^{1}H$ NMR (400 MHz, $CDCl_3$, 25° C., TMS): δ (ppm) 7.88 (d, 1H, J=8.0 Hz), 7.54 (t, 1H, J=8.8 Hz), 7.42 (q, 2H, J=9.6 Hz), 4.33 (t, 2H, J=6.8 Hz), 3.35 (d, 3H, J=2.8 Hz), 3.07 (t, 2H, J=8.0 Hz), 1.86-1.73 (m, 4H), 1.53-1.39 (m, 4H), 1.01-0.91 (m, 6H).

$^{13}C$ NMR (400 MHz, $CDCl_3$, 25° C., TMS): δ (ppm) 166.22, 140.37, 132.58, 131.20, 130.64, 130.61, 128.16, 65.32, 51.61, 39.37, 30.60, 25.27, 21.69, 19.22, 13.59.

Example 2

Methyl 2-(N-methylphenylsulfonamido)benzoate

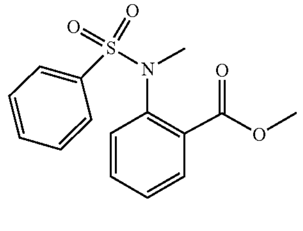 [SMILES: COC(=O)c1ccccc1N(C)S(=O)(=O)c1ccccc1]

The reaction steps were the same as those in Example 1, except that in Step (1), the raw material n-butanol was replaced with methanol to synthesize methyl 2-aminobenzoate first; then in Step (2) the butyl sulfonyl chloride was replaced with phenyl sulfonyl chloride to obtain methyl 2-phenylsulfonamido benzoate; then in Step (3) the butyl 2-butylsulfonamido benzoate was replaced with methyl 2-phenylsulfonamido benzoate to obtain methyl 2-(N-methylphenylsulfonamido)benzoate as white solid particles with a melting point of 97° C., in a yield of 59%.

Figure 3:
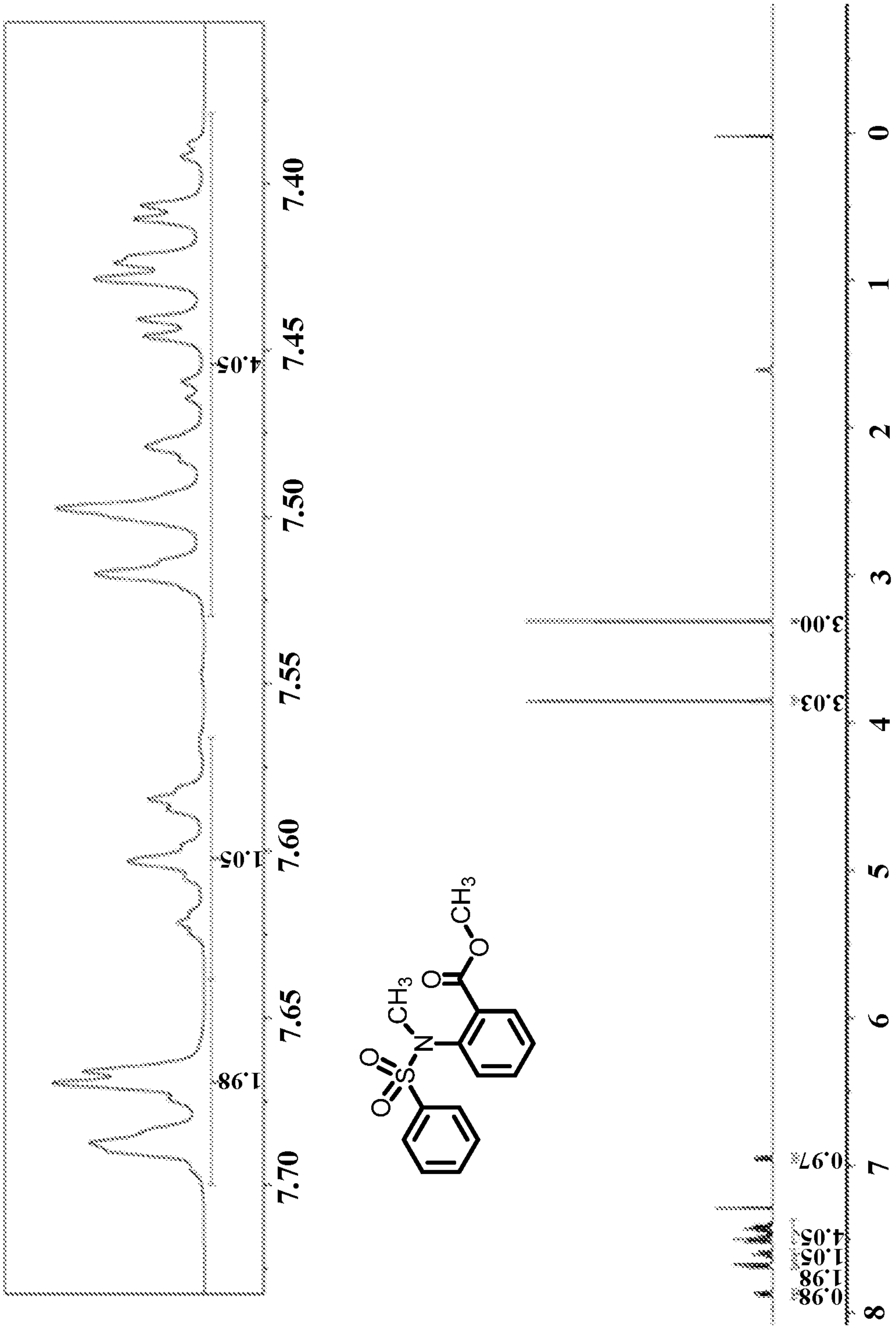
FIG. 3 shows the $^{1}H$ spectrum of methyl 2-(N-methylphenylsulfonamido)benzoate obtained in Example 2.
Figure 4:
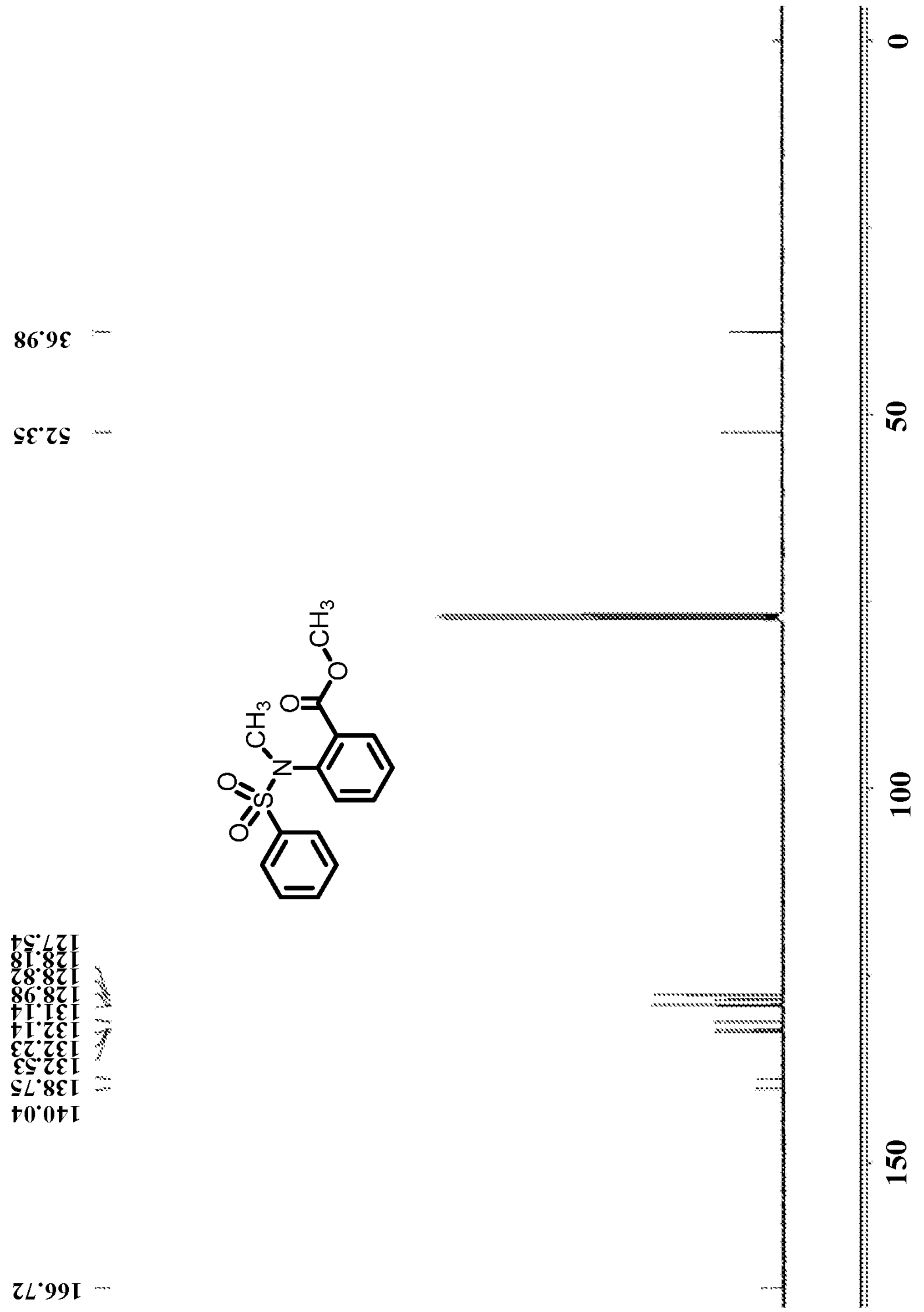
FIG. 4 shows the $^{13}C$ spectrum of methyl 2-(N-methylphenylsulfonamido)benzoate obtained in Example 2.

The $^{1}H$ and $^{13}C$ NMR spectra of the methyl 2-(N-methylphenylsulfonamido)benzoate are shown in FIGS. 3 and 4.

$^{1}H$ NMR (400 MHz, $CDCl_3$, 25° C., TMS): δ (ppm) 7.88-7.86 (dd, 1H, $J_1$=8.0 Hz, $J_2$=2.8 Hz), 7.67 (d, 2H, J=8.0 Hz), 7.60 (t, 1H, J=8.0 Hz), 7.52-7.39 (m, 4H), 6.96-6.94 (dd, 1H, $J_1$=8.0 Hz, $J_2$=2.0 Hz), 3.85 (s, 3H), 3.13 (s, 3H).

$^{13}C$ NMR (400 MHz, $CDCl_3$, 25° C., TMS): δ (ppm) 166.72, 140.04, 138.75, 132.53, 132.23, 132.14, 131.14, 128.98, 128.82, 128.18, 127.54, 52.35, 38.98.

Example 3

Methyl 2-(N-methylbutylsulfonamido)benzoate

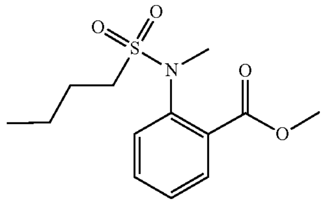 [SMILES: CCCCS(=O)(=O)N(C)c1ccccc1C(=O)OC]

The reaction steps were the same as those in Example 1, except that in Step (1) the raw material n-butanol was replaced with methanol to synthesize methyl 2-aminobenzoate first; then in Step (2) methyl 2-butylsulfonamido benzoate was obtained; and in Step (3) the butyl 2-butylsulfonamido benzoate was replaced with methyl 2-butylsulfonamido benzoate to obtain methyl 2-(N-methylbutylsulfonamido)benzoate as reddish brown powder with a melting point of 42° C., in a yield of 53%.

Figure 5:
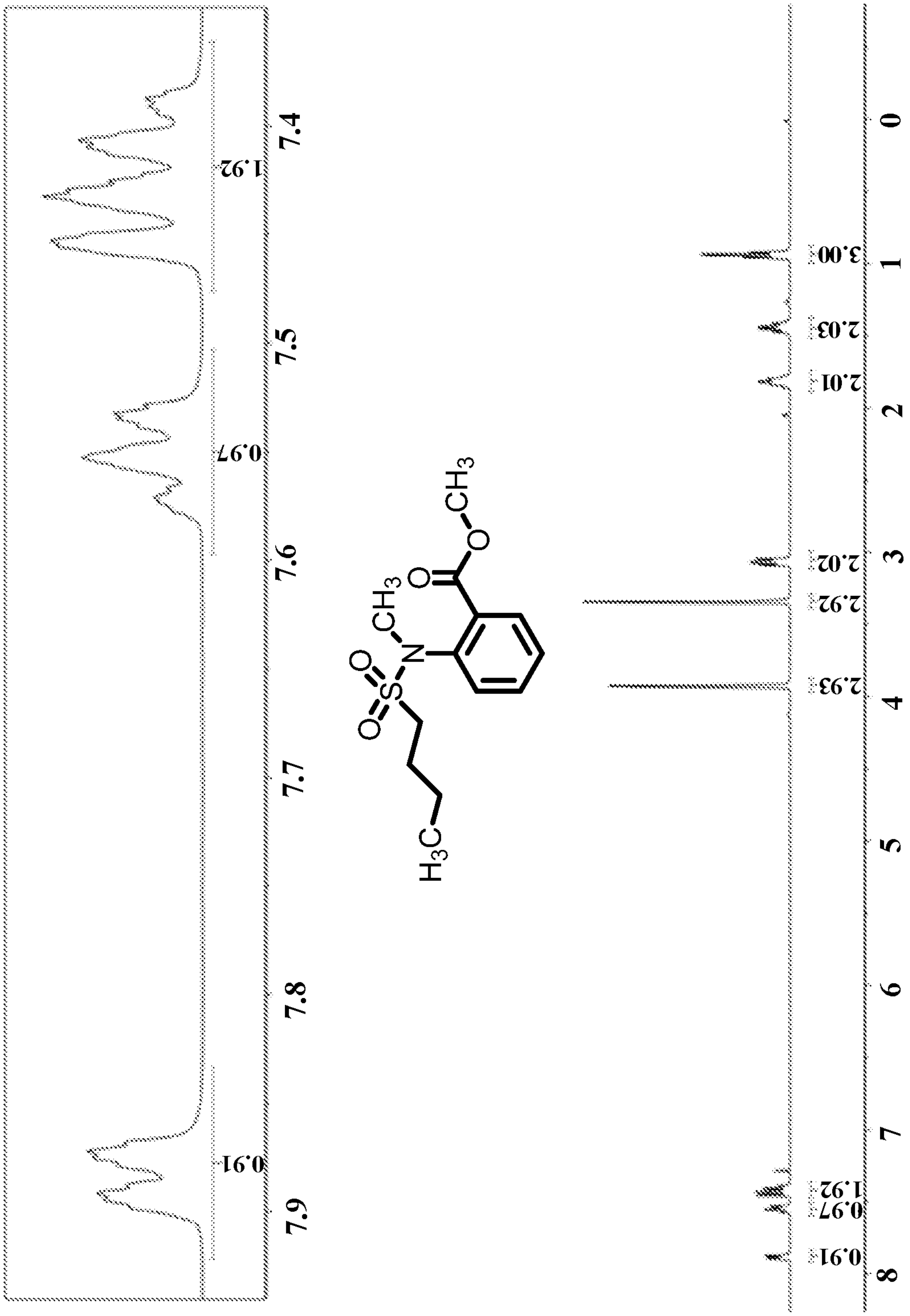
FIG. 5 shows the $^{1}H$ spectrum of methyl 2-(N-methylbutylsulfonamido)benzoate obtained in Example 3.
Figure 6:
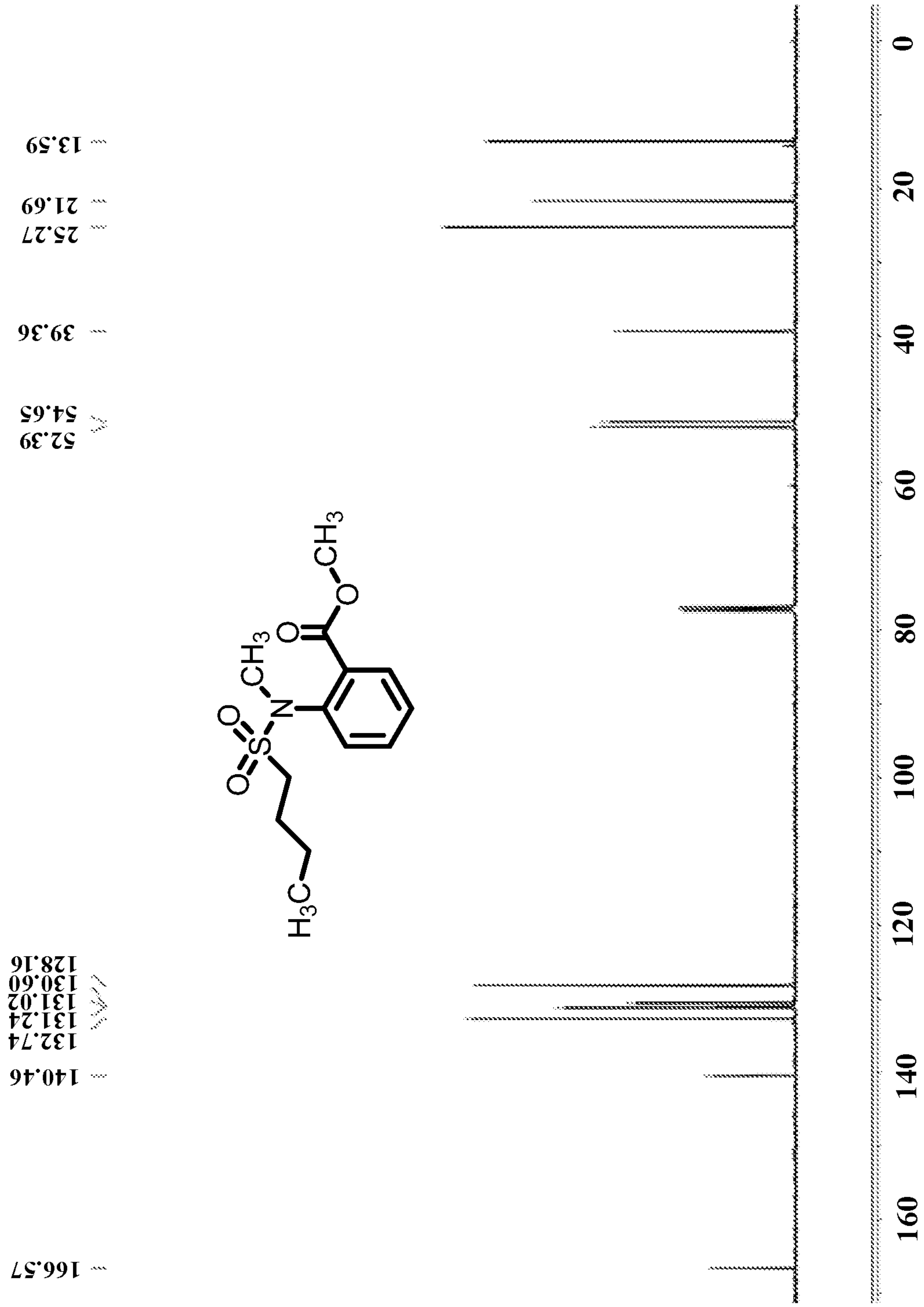
FIG. 6 shows the $^{13}C$ spectrum of methyl 2-(N-methylbutylsulfonamido)benzoate obtained in Example 3.

The $^{1}H$ and $^{13}C$ NMR spectra of the methyl 2-(N-methylbutylsulfonamido)benzoate are shown in FIGS. 5 and 6.

$^{1}H$ NMR (400 MHz, $CDCl_3$, 25° C., TMS): δ (ppm) 7.90-7.87 (dq, 1H, $J_1$=1.6 Hz, $J_2$=7.6 Hz), 7.56 (t, 1H, J=8.4 Hz), 7.41 (q, 2H, J=8.4 Hz), 3.93 (t, 3H, J=1.6 Hz), 3.34 (t, 3H, J=1.2 Hz), 3.07 (t, 2H, J=8.0 Hz), 1.86-1.78 (m, 2H), 1.44 (q, 2H, J=7.6 Hz), 0.94 (t, 3H, J=7.6 Hz).

$^{13}C$ NMR (400 MHz, $CDCl_3$, 25° C., TMS): δ (ppm) 166.57, 140.46, 132.74, 131.24, 131.02, 130.60, 128.16, 52.39, 51.65, 39.36, 25.27, 21.69, 13.59.

Example 4

Isopropyl 2-(N-methylphenylsulfonamido)benzoate

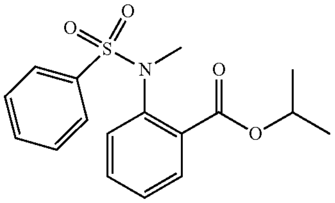 [SMILES: CC(C)OC(=O)c1ccccc1N(C)S(=O)(=O)c1ccccc1]

The reaction steps were the same as those in Example 1, except that in step (1) the raw material n-butanol was replaced with isopropanol to synthesize isopropyl 2-aminobenzoate first; then in Step (2) the butyl sulfonyl chloride was replaced with phenyl sulfonyl chloride to obtain isopropyl 2-phenylsulfonamido benzoate; and in Step (3) the butyl 2-butylsulfonamido benzoate was replaced with isopropyl 2-phenylsulfonamido benzoate to obtain isopropyl 2-(N-methylphenylsulfonamido)benzoate as white flocculent needle crystals with a melting point of 118° C., in a yield of 68%.

Figure 7:
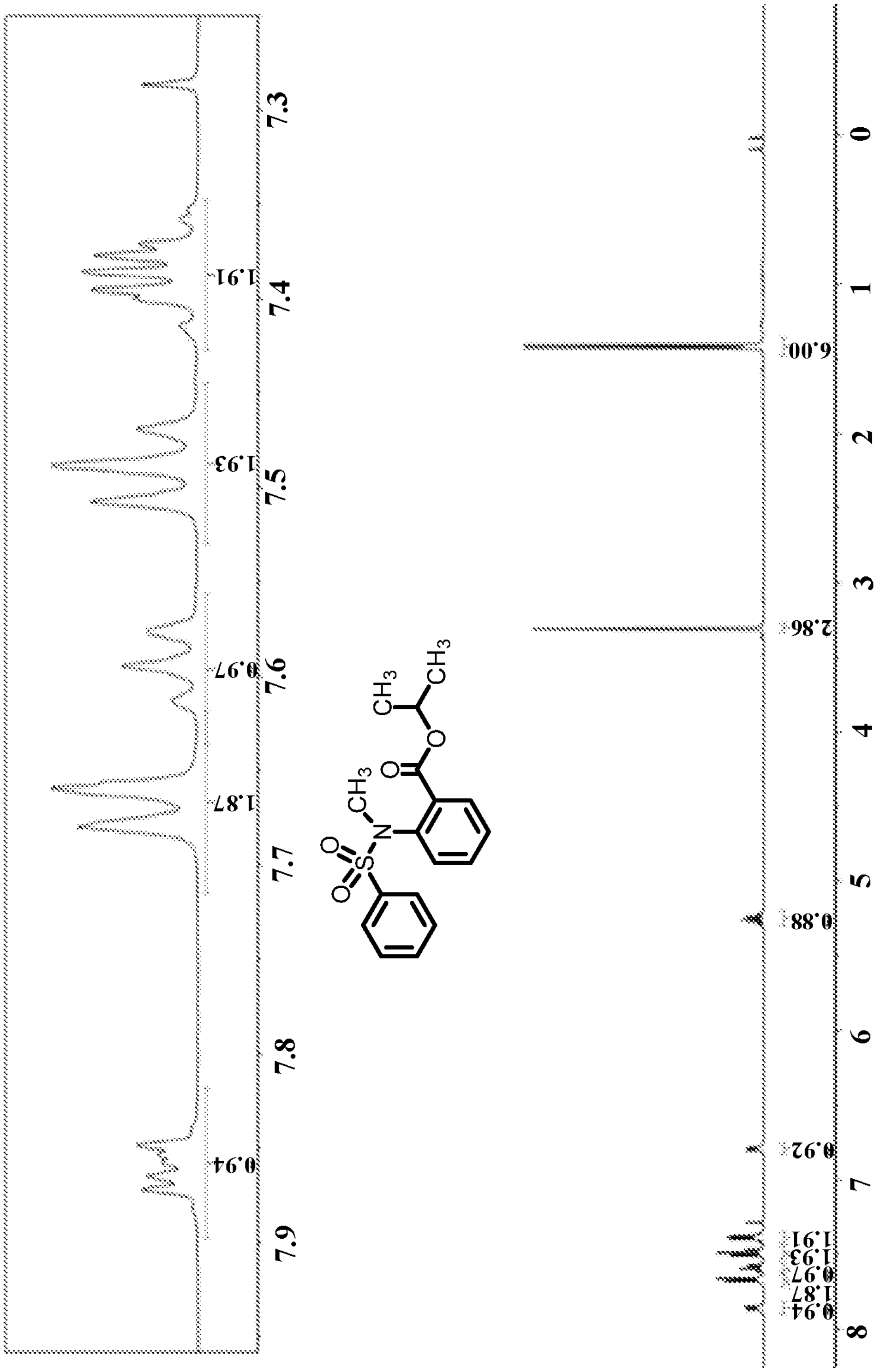
FIG. 7 shows the $^{1}H$ spectrum of isopropyl 2-(N-methylphenylsulfonamido)benzoate obtained in Example 4.
Figure 8:
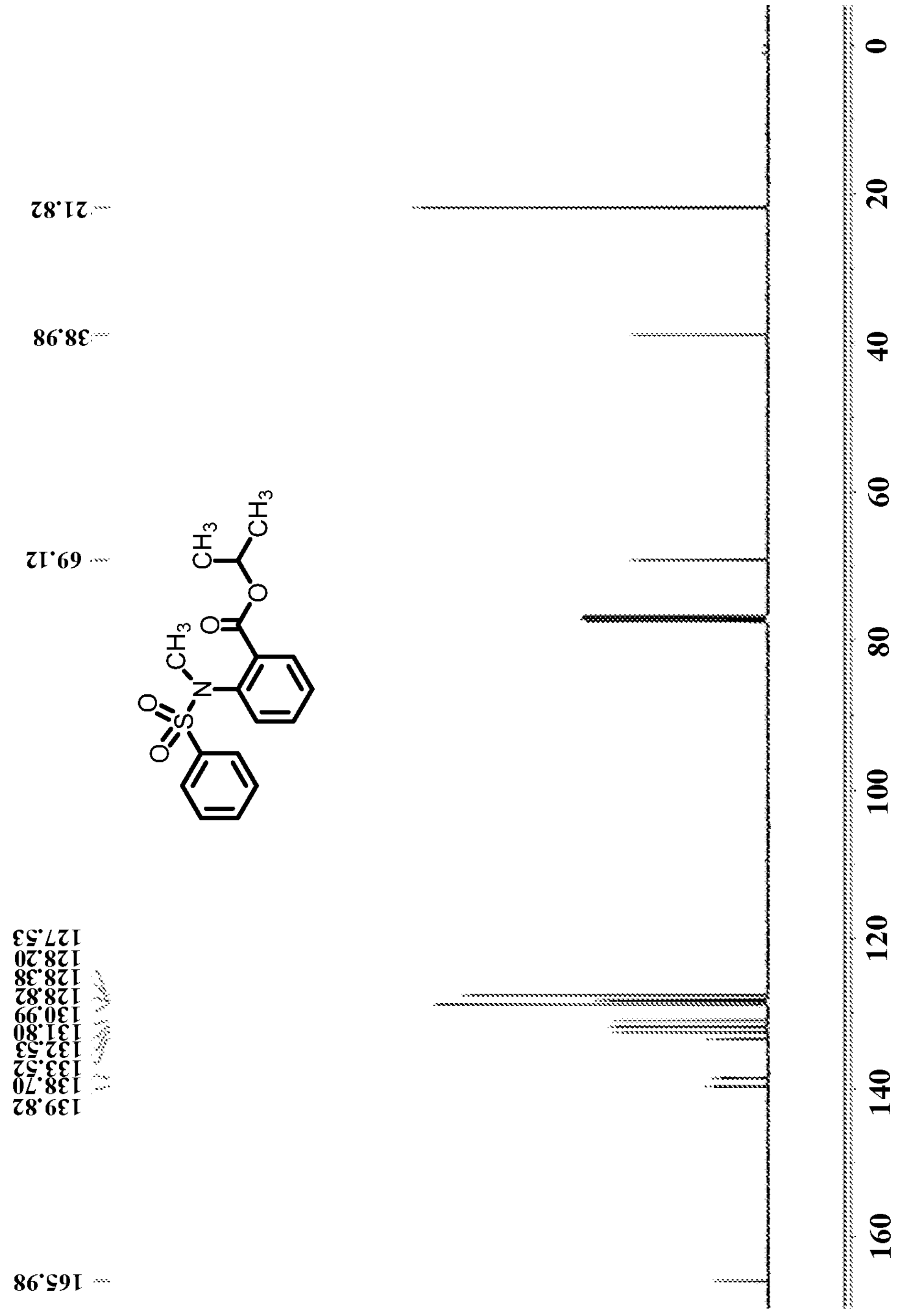
FIG. 8 shows the $^{13}C$ spectrum of isopropyl 2-(N-methylphenylsulfonamido)benzoate obtained in Example 4.

The $^{1}H$ and $^{13}C$ NMR spectra of the isopropyl 2-(N-methylphenylsulfonamido)benzoate are shown in FIGS. 7 and 8.

$^{1}H$ NMR (400 MHz, $CDCl_3$, 25° C., TMS): δ (ppm) 7.87-7.85 (m, 1H), 7.67 (d, 2H, J=8.4 Hz), 7.60 (t, 1H, J=7.2

Hz), 7.49 (t, 2H, J=8.0 Hz), 7.42-7.35 (m, 2H), 6.80-6.78 (m, 1H), 5.30-5.21 (m, 1H), 3.31 (s, 3H), 1.42 (d, 6H, J=6.4 Hz).

$^{13}C$ NMR (400 MHz, $CDCl_3$, 25° C., TMS): δ (ppm) 165.98, 139.82, 138.70, 133.52, 132.53, 131.80, 130.99, 128.82, 128.38, 128.20, 127.53, 69.12, 38.98, 21.82.

Example 5

Propyl 2-(N-methylbutylsulfonamido)benzoate

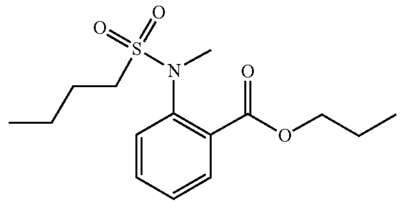 [SMILES: CCCCS(=O)(=O)N(C)c1ccccc1C(=O)OCCC]

The reaction steps were the same as those in Example 1, except that in step (1) the raw material n-butanol was replaced with n-propanol to synthesize propyl 2-aminobenzoate first; then in Step (2) propyl 2-butylsulfonamido benzoate was obtained; and in Step (3) the butyl 2-butylsulfonamido benzoate was replaced with propyl 2-butylsulfonamido benzoate to obtain propyl 2-(N-methylbutylsulfonamido)benzoate as a golden yellow oily liquid, in a yield of 73%.

Figure 9:
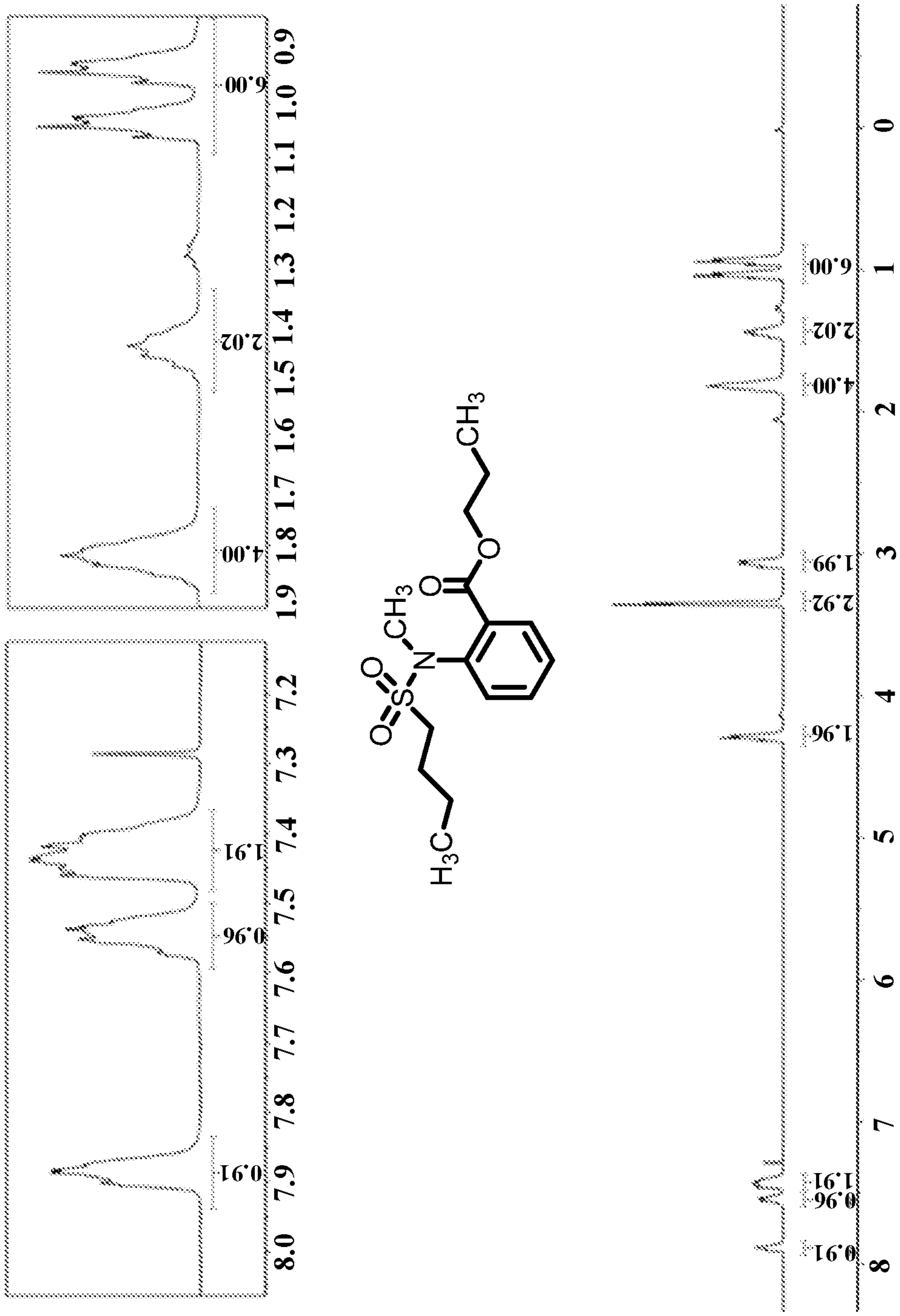
FIG. 9 shows the $^{1}H$ spectrum of propyl 2-(N-methylbutylsulfonamido)benzoate obtained in Example 5.
Figure 10:
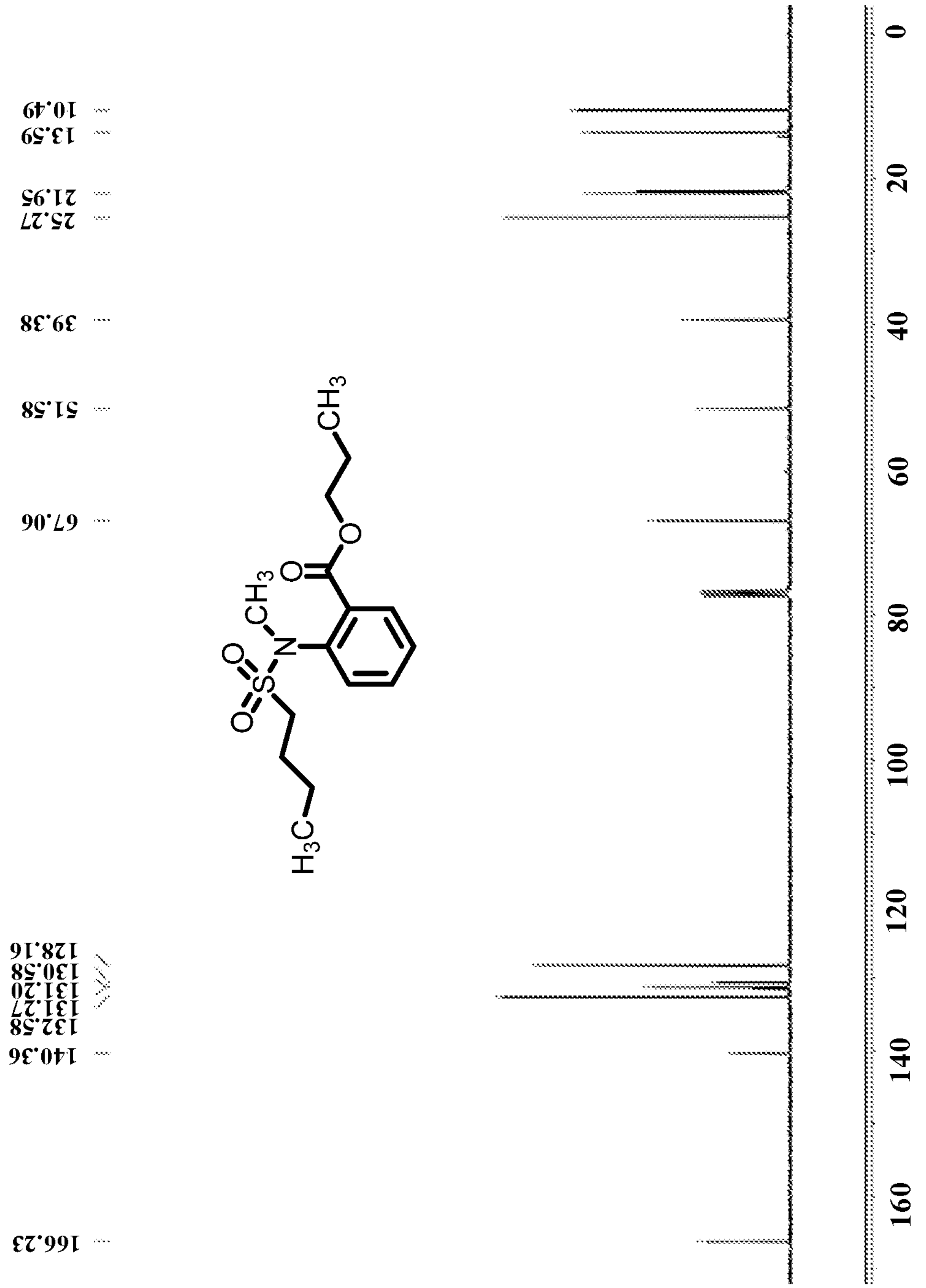
FIG. 10 shows the $^{13}C$ spectrum of propyl 2-(N-methylbutylsulfonamido)benzoate obtained in Example 5.

The $^{1}H$ and $^{13}C$ NMR spectra of the propyl 2-(N-methylbutylsulfonamido)benzoate are shown in FIGS. 9 and 10.

$^{1}H$ NMR (400 MHz, $CDCl_3$, 25° C., TMS): δ (ppm) 7.89 (t, 1H, J=4.0 Hz), 7.55 (q, 1H, J=5.6 Hz), 7.46-7.40 (m, 2H), 4.32-4.27 (m, 2H), 3.36 (s, 3H), 3.09-3.05 (m, 2H), 1.87-1.79 (m, 4H), 1.50-1.43 (m, 2H), 1.06-0.93 (dt, 6H, $J_1$=7.6 Hz, $J_2$=40 Hz).

$^{13}C$ NMR (400 MHz, $CDCl_3$, 25° C., TMS): δ (ppm) 166.23, 140.36, 132.58, 131.22, 131.20, 130.58, 128.16, 67.06, 51.58, 39.38, 25.27, 21.95, 13.59, 10.49.

Example 6

Isobutyl 2-(N-methylethylsulfonamido)benzoate

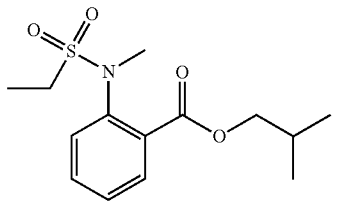 [SMILES: CCS(=O)(=O)N(C)c1ccccc1C(=O)OCC(C)C]

The reaction steps were the same as those in Example 1, except that the raw material n-butanol was replaced with isobutanol to synthesize isobutyl 2-aminobenzoate first; then in Step (2) the butyl sulfonyl chloride was replaced with ethyl sulfonyl chloride to obtain isobutyl 2-ethylsulfonamido benzoate; and in Step (3) the butyl 2-butylsulfonamido benzoate was replaced with isobutyl 2-ethylsulfonamido benzoate to obtain isobutyl 2-(N-methylethylsulfonamido) benzoate as off-white powder with a melting point of 78° C., in a yield of 53%.

Figure 11:
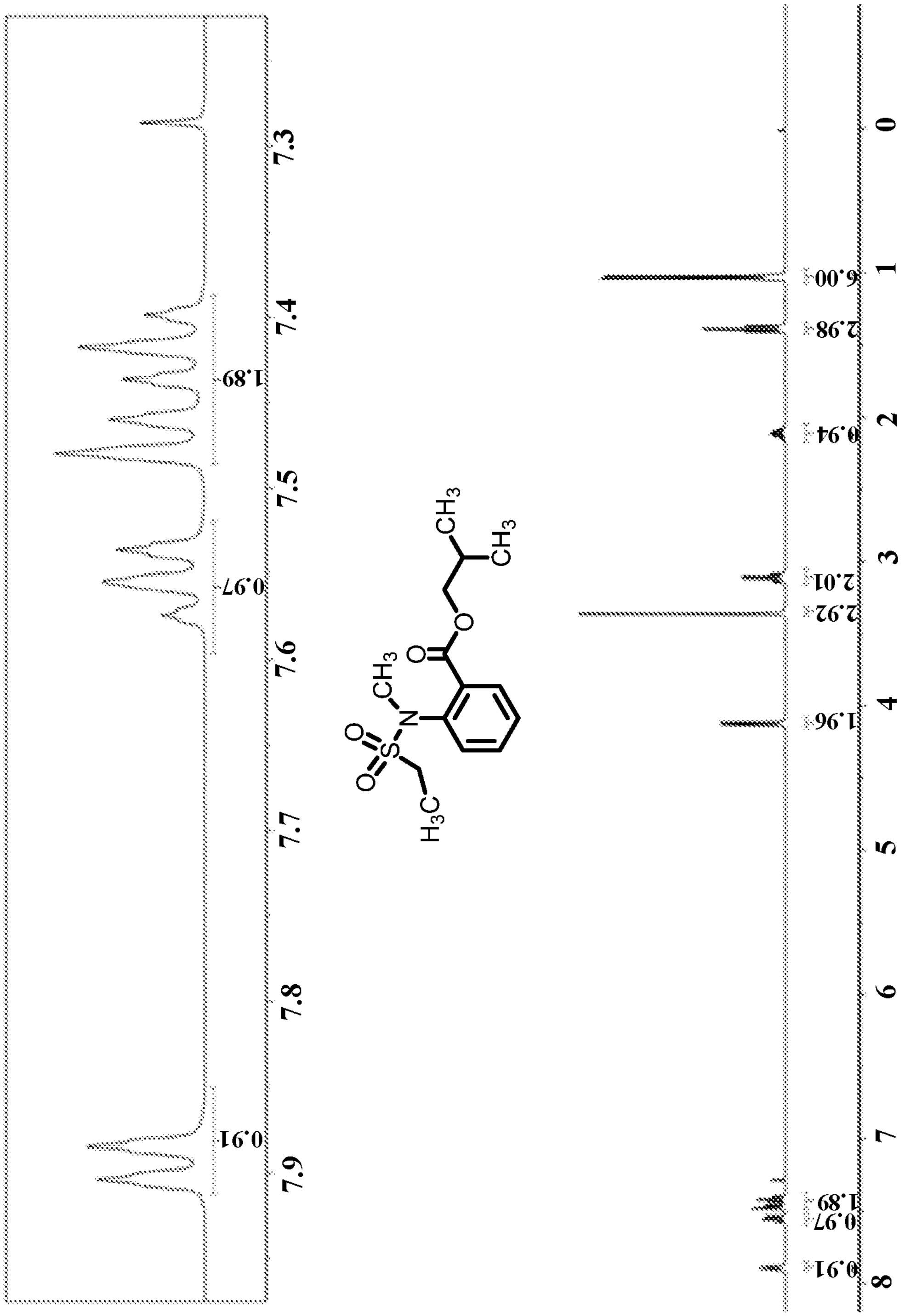
FIG. 11 shows the $^{1}H$ spectrum of isobutyl 2-(N-methylethylsulfamoyl)benzoate obtained in Example 6.
Figure 12:
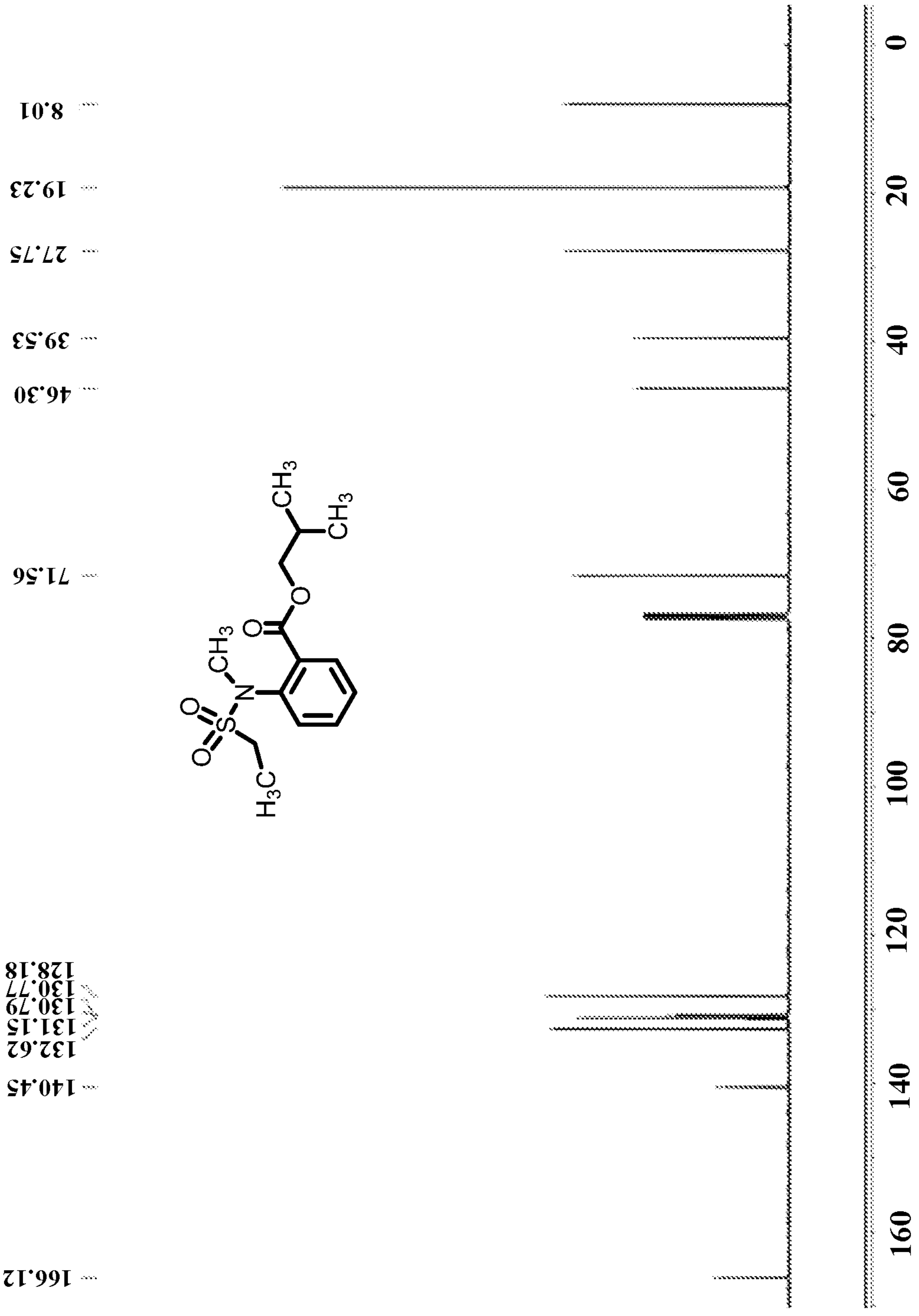
FIG. 12 shows the $^{13}C$ spectrum of isobutyl 2-(N-methylethylsulfonamido)benzoate obtained in Example 6.

The $^{1}H$ and $^{13}C$ NMR spectra of the isobutyl 2-(N-methylethylsulfonamido)benzoate are shown in FIGS. 11 and 12.

$^{1}H$ NMR (400 MHz, $CDCl_3$, 25° C., TMS): δ (ppm) 7.90 (d, 1H, J=7.6 Hz), 7.56 (t, 1H, J=7.6 Hz), 7.48-7.40 (m, 2H), 7.29 (s, 1H), 4.12 (d, 2H, J=6.8 Hz), 3.36 (d, 3H, J=0.8 Hz), 3.11 (q, 2H, J=7.2 Hz), 2.16-2.06 (m, 1H), 1.39 (t, 3H, J=7.2 Hz), 1.04-1.02 (dd, 6H, $J_1$=1.2 Hz, $J_2$=6.8 Hz).

$^{13}C$ NMR (400 MHz, $CDCl_3$, 25° C., TMS): δ (ppm) 166.12, 140.45, 132.62, 131.15, 130.79, 130.77, 128.18, 71.56, 46.30, 39.53, 27.75, 19.23, 8.01.

Part II. Preparation and Evaluation of Catalysts

Example 7

This example provides a catalyst for propylene polymerization, which was prepared by the process as follows.

To a reaction flask containing 250 mL $TiCl_4$ and precooled to −30° C., 7.8 g spherical $MgCl_2 \cdot 2.65C_2H_5OH$ as a support was added slowly, and gradually heated to 80° C. Then 5 mmol methyl 2-(N-methylphenylsulfonamido)benzoate as an internal electron donor was added, and the above temperature was maintained for 30 minutes and then elevated to 130° C. to allow a reaction to proceed for 2 h, followed by filtration. Then 250 mL $TiCl_4$ was added to allow a reaction to proceed at 130° C. for 2 h. The resultant was washed with n-hexane 6 times, and dried under vacuum to obtain 3.6 g catalyst having a titanium content of 2.2%.

The above catalyst for propylene polymerization was used for a propylene polymerization experiment, which was carried out in a 2 L stainless steel autoclave.

The pressure in the polymerization autoclave was released first until the gauge pressure was 0, and the autoclave was fully purged with high-purity nitrogen and then vacuumized for 1 h under heating. After the autoclave was cooled to room temperature, high-purity hydrogen gas at 0.1 MPa and 300 g propylene were fed into the autoclave under low-speed stirring. Via a catalyst dosing hopper protected in nitrogen, 10 mg of the catalyst of this example, 2 mL triethylaluminum (2.4 mol/L), and 2.5 mL methylcyclohexyldimethoxysilane (0.18 mol/L) were briefly pre-complexed and then added to the autoclave. Then 300 g propylene was further added, and the temperature was raised to 70° C. to allow a reaction to proceed for 1 h. At the end of the reaction, stirring was stopped, the resultant was cooled, the pressure was released, and the product was discharged to obtain a solid propylene polymer.

For a one-hour polymerization reaction, the catalyst showed a polymerization activity of 38.3 kg PP/g cat, and the resultant polypropylene had an isotacticity of 98.2%.

Example 8

This example provides a catalyst for propylene polymerization, which was prepared by the same process as that in Example 7, except that propyl 2-(N-methylbutylsulfonamido)benzoate was used as the electron donor to obtain 0.87 g solid catalyst having a titanium content of 2.85%.

The above catalyst for propylene polymerization was used for a propylene polymerization experiment according to the same procedure as in Example 7.

For a one-hour polymerization reaction, the catalyst showed a polymerization activity of 36.3 kg PP/g cat, and the resultant polypropylene had an isotacticity of 97.9%.

Example 9

This example provides a catalyst for propylene polymerization, which was prepared by the same process as that in Example 7, except that isopropyl 2-(N-methylphenylsulfonamido)benzoate was used as the electron donor to obtain 0.78 g solid catalyst having a titanium content of 3.2%.

For a one-hour polymerization reaction, the catalyst showed a polymerization activity of 35.0 kg PP/g cat, and the resultant polypropylene had an isotacticity of 97.3%.

Example 10

This example provides a catalyst for propylene polymerization, which was prepared by the same process as that in Example 7, except that butyl 2-(N-methylbutylsulfonamido) benzoate was used as the electron donor to obtain 0.78 g solid catalyst having a titanium content of 3.2%.

The above catalyst for propylene polymerization was used for a propylene polymerization experiment according to the same procedure as in Example 7.

For a one-hour polymerization reaction, the catalyst showed a polymerization activity of 35.0 kg PP/g cat, and the resultant polypropylene had an isotacticity of 97.3%.

Example 11

This example provides a catalyst for propylene polymerization, which was prepared by the same process as that in Example 7, except that methyl 2-(N-methylbutylsulfonamido)benzoate was used as the electron donor to obtain 3.6 g catalyst having a titanium content of 2.2%.

The above catalyst for propylene polymerization was used for a propylene polymerization experiment according to the same procedure as in Example 7.

For a one-hour polymerization reaction, the catalyst showed a polymerization activity of 37.6 kg PP/g cat, and the resultant polypropylene had an isotacticity of 96.0%.

Example 12

This example provides a catalyst for propylene polymerization, which was prepared by the same process as that in Example 7, except that isobutyl 2-(N-methylethylsulfonamido)benzoate was used as the electron donor to obtain 3.2 g spherical catalyst having a titanium content of 2.8%.

The above catalyst for propylene polymerization was used for a propylene polymerization experiment according to the same procedure as in Example 7.

For a one-hour polymerization reaction, the catalyst showed a polymerization activity of 38.2 kg PP/g cat, and the resultant polypropylene had an isotacticity of 96.8%.

Example 13

This example provides a catalyst for propylene polymerization, which was prepared by the same process that in Example 7, except that isopropyl 2-(N-methylcyclohexylsulfonamido)benzoate was used as the electron donor to obtain 3.0 g spherical catalyst having a titanium content of 3.0%.

The above catalyst for propylene polymerization was used for a propylene polymerization experiment according to the same procedure as in Example 7.

For a one-hour polymerization reaction, the catalyst showed a polymerization activity of 38.9 kg PP/g cat, and the resultant polypropylene had an isotacticity of 95.8%.

Example 14

This example provides a catalyst for propylene polymerization, which was prepared by the same process as that in Example 7, except that ethyl 2-(N-methylethylsulfonamido) benzoate was used as the electron donor to obtain 3.4 g spherical catalyst having a titanium content of 2.9%.

The above catalyst for propylene polymerization was used for a propylene polymerization experiment according to the same procedure as in Example 7.

For a one-hour polymerization reaction, the catalyst showed a polymerization activity of 35.3 kg PP/g cat, and the resultant polypropylene had an isotacticity of 96.5%.

As can be seen through the above data, the use of the compound according to the present invention as the electron donor in a catalyst for a polypropylene results in a higher catalyst activity and better stereospecificity.

Obviously, the above embodiments of the present invention are only examples to clearly illustrate the present invention, and not to limit the way of implementation of the present invention, and other different forms of variations or changes can be made on the basis of the above description by those of ordinary skill in the field. It is not possible to exhaust all the embodiments here, but all obvious variations or changes derived from the technical solutions of the present invention are still within the scope of protection of the present invention.

What is claimed is:

1. A catalyst for propylene polymerization, comprising:

an activated magnesium halide, a titanium compound supported on the activated magnesium halide, containing at least one Ti-halogen bond, and an internal electron donor compound;

wherein the internal electron donor compound is one or more selected from the compounds having a structure of Formula (1):

[Formula (1)]

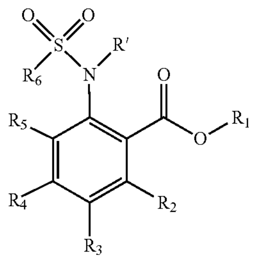

wherein $R_1$ and $R_6$ are each independently selected from a $C_1$-$C_{12}$ straight or branched alkyl, a $C_3$-$C_{15}$ cycloalkyl, or an aryl, and R' is H, a $C_1$-$C_5$ straight or branched alkyl, or phenyl; and $R_2$, $R_3$, $R_4$, and $R_5$ are each independently selected from H, halogen, a $C_1$-$C_{12}$ straight or branched alkyl, a $C_3$-$C_8$ cycloalkyl, a $C_6$-$C_{15}$ aryl, or an arylalkyl.

2. The catalyst for propylene polymerization according to claim 1, wherein in Formula (1), R' is methyl.

3. The catalyst for propylene polymerization according to claim 2, wherein in Formula (1), $R_6$ is selected from a $C_1$-$C_{12}$ straight or branched alkyl, or phenyl.

4. The catalyst for propylene polymerization according to claim 3, wherein in Formula (1), $R_1$ is selected from a $C_1$-$C_{12}$ straight or branched alkyl.

5. The catalyst for propylene polymerization according to claim 4, wherein in Formula (1), $R_2$, $R_3$, $R_4$ and $R_5$ are all H atoms.

6. The catalyst for propylene polymerization according to claim 1, wherein the internal electron donor compound is any one or more selected from the following compounds:
butyl 2-(N-methylbutylsulfonamido)benzoate;
methyl 2-(N-methylphenylsulfonamido)benzoate;
methyl 2-(N-methylbutylsulfonamido)benzoate;
isopropyl 2-(N-methylphenylsulfonamido)benzoate;
propyl 2-(N-methylbutylsulfonamido)benzoate;
isobutyl 2-(N-methylethylsulfonamido)benzoate;
methyl 2-(N-methylmethylsulfonamido)benzoate;
neopentyl 2-(N-methylbutylsulfonamido)benzoate;
cyclopentyl 2-(N-methylpropylsulfonamido)benzoate;
cyclohexyl 2-(N-methylpropylsulfonamido)benzoate;
methyl 2-(N-methylcyclopropylsulfonamido)benzoate;
methyl 2-(N-methylcyclopentylsulfonamido)benzoate;
methyl 2-(N-methylpentylsulfonamido)benzoate;
isopropyl 2-(N-methylcyclohexylsulfonamido)benzoate;
propyl 2-(N-methylheptylsulfonamido)benzoate;
isobutyl 2-(N-methyl-p-tolylsulfonamido)benzoate;
phenyl 2-(N-methylbutylsulfonamido)benzoate;
isooctyl 2-(N-methylbutylsulfonamido)benzoate;
p-tolyl 2-(N-methylpropylsulfonamido)benzoate;
ethyl 2-(N-methylethyl sulfonamido)benzoate;
ethyl 2-(N-methylpentylsulfonamido)benzoate;
isobutyl 2-(N-methylphenylsulfonamido)benzoate;
isobutyl 2-(N-methylbutylsulfonamido)benzoate;
neopentyl 2-(N-methyl-p-tolylsulfonamido)benzoate;
p-tolyl 2-(N-methylbutylsulfonamido)benzoate;
isooctyl 2-(N-methylethylsulfonamido)benzoate;
p-tolyl 2-(N-methylcyclohexylsulfonamido)benzoate;
propyl 2-(N-methyl-β-naphthylsulfonamido)benzoate;
methyl 2,3,4,5-tetramethyl-6-(N-methylsulfonamido) benzoate;
methyl 4-bromo-6-(N-ethylsulfonamido)benzoate;
methyl 3-isopropyl-6-(N-butylsulfonamido)benzoate;
butyl 2-(N-butylsulfonamido)benzoate;
methyl 2-(N-phenylsulfonamido)benzoate;
methyl 2-(N-butylsulfonamido)benzoate;
isopropyl 2-(N-phenylsulfonamido)benzoate;
propyl 2-(N-butylsulfonamido)benzoate; and
isobutyl 2-(N-ethylsulfonamido)benzoate.

7. The catalyst for propylene polymerization according to claim 1, wherein the precursor of the activated magnesium halide is a magnesium halide alcoholate having a general formula of $Mg(OR^1)_{2-m}X_m \cdot n\ (R^2OH)$,
wherein $R_1$ is selected from a $C_1$-$C_{20}$ alkyl, X is halogen, m is 1 or 2, n is a fractional or integer number satisfying $0<n<5$, and $R^2$ is selected from a $C_1$-$C_{20}$ alkyl.

8. The catalyst for propylene polymerization according to claim 7, wherein the magnesium halide in the magnesium halide alcoholate comprises one or more of magnesium chloride, magnesium bromide, magnesium chloride methoxide, and magnesium chloride ethoxide; and the alcohol in the magnesium halide alcoholate comprises one or more of methanol, ethanol, propanol, isopropanol, butanol and isobutanol.

9. The catalyst for propylene polymerization according to claim 8, wherein, in the magnesium halide alcoholate, the magnesium halide is magnesium chloride and the alcohol is ethanol.

10. The catalyst for propylene polymerization according to claim 1, wherein the titanium compound comprises one or more of titanium chloride trialkoxide, titanium dichloride dialkoxide, titanium trichloride alkoxide, titanium tetrachloride and titanium tetrabromide.

11. The catalyst for propylene polymerization according to claim 10, wherein the titanium compound is titanium tetrachloride.

12. The catalyst for propylene polymerization according to claim 1, wherein based on 100% of the total mass of the catalyst for propylene polymerization, the content of the magnesium element is 10% to 25% by mass, the content of the titanium element is 1% to 15% by mass, the total content of halogen in the magnesium halide and the titanium compound is 40% to 60% by mass, and the content of the internal electron donor is 1% to 10% by mass.

13. A method for preparing the catalyst for propylene polymerization according to claim 1, comprising the steps of:
(S1) adding the precursor of the activated magnesium halide to a portion of the titanium compound liquid, and cooling them to a first predetermined temperature to allow a reaction to proceed;
(S2) increasing gradually the temperature to a second predetermined temperature, adding the internal electron donor compound, and allowing the reaction to continue;
(S3) adding the remainder of the titanium compound at a third predetermined temperature, allowing the reaction to continue, and filtering the reaction system after the reaction is completed, to obtain a solid residue; and
(S4) washing and drying the solid residue to obtain the catalyst for propylene polymerization.

14. The method according to claim 13, wherein in step (S2) the molar ratio of the magnesium element to the internal electron donor compound is 1:1 to 20:1.

15. The method according to claim 13, wherein
in step (S1), the first predetermined temperature is −40° C. to 0° C., and the reaction proceeds for a period of 0.1 h to 3 h;
in step (S2), the second predetermined temperature is 40° C. to 100° C., and the reaction proceeds for a period of 0.5 h to 3 h;
in step (S3), the third predetermined temperature is 80° C. to 140° C., and the reaction proceeds for a period of 0.5 h to 3 h.

16. A catalyst system for propylene polymerization, comprising the catalyst for propylene polymerization according to claim 1, a co-catalyst, and an external electron donor.

17. The catalyst system for propylene polymerization according to claim 16, wherein the co-catalyst is an alkyl aluminum compound having a general formula of $AlR^3_pX_{3-p}$, wherein $R_3$ is a $C_1$-$C_{20}$ alkyl group; X is halogen; and p is an integer satisfying $1 \le p \le 3$; and
the external electron donor is a siloxane compound having a general formula of $R^4_qSi(OR^5)_{4-q}$, wherein $R^4$ is a $C_1$-$C_{10}$ alkyl, cycloalkyl or aryl group; $R^5$ is an alkyl having 1 to 4 carbon atoms; and q is an integer satisfying $0<q<3$.

18. The catalyst system for propylene polymerization according to claim 16, wherein the co-catalyst comprises one or more of trimethylaluminum, triethylaluminum, triisobutylaluminum, trioctylaluminum, diethylaluminum monohydride, diisobutylaluminum monohydride, diethylaluminum monochloride, diisobutylaluminum monochloride, and ethylaluminum dichloride.

19. The catalyst system for propylene polymerization according to claim 16, wherein the external electron donor comprises one or more of methylcyclohexyldimethoxysilane phenyltrimethoxysilane, phenyltriethoxysilane, and diphenyldimethoxysilane.

20. The catalyst system for propylene polymerization according to claim 16, wherein the molar ratio of titanium in the catalyst for propylene polymerization to aluminum in the co-catalyst is 1:1 to 1:2,000; and the molar ratio Si/Ti of Si in the external electron donor to Ti in the catalyst for propylene polymerization is 1:1 to 1:100.

* * * * *